(12) United States Patent
Bao et al.

(10) Patent No.: US 6,266,108 B1
(45) Date of Patent: *Jul. 24, 2001

(54) REFLECTIVE LIQUID CRYSTAL DISPLAY DEVICE WITH A PANEL, A LIGHT GUIDE PLATE AND POLARIZING PLATE

(75) Inventors: Yang Ying Bao; Tetsuo Urabe; Yukio Kinoshita; Hideo Kataoka; Takayuki Fujioka, all of Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,765
(22) Filed: Mar. 24, 1998

(30) Foreign Application Priority Data

Mar. 25, 1997 (JP) .................................... 9-090135
Sep. 10, 1997 (JP) .................................... 9-262876

(51) Int. Cl.$^7$ ............................................ G02F 1/335
(52) U.S. Cl. .......................... 349/63; 349/61; 349/62; 349/67; 349/113
(58) Field of Search ........................ 349/61, 62, 67, 349/63, 70, 113

(56) References Cited

U.S. PATENT DOCUMENTS

| | | | |
|---|---|---|---|
| 4,212,048 | 7/1980 | Castleberry | 362/19 |
| 4,737,896 | 4/1988 | Mochizuki et al. | 362/319 |
| 5,005,108 | * 4/1991 | Pristash et al. | 362/31 |
| 5,050,946 | * 9/1991 | Hathaway et al. | 385/33 |
| 5,341,231 | * 8/1994 | Yamamoto et al. | 359/49 |
| 5,485,354 | * 1/1996 | Ciupke et al. | 362/31 |
| 5,489,999 | * 2/1996 | Matsumoto | 359/49 |
| 5,673,128 | * 9/1997 | Ohta et al. | 359/49 |
| 5,703,667 | * 12/1997 | Ochiai | 349/62 |
| 5,712,694 | * 1/1998 | Taira et al. | 349/62 |
| 5,808,709 | * 9/1998 | Davis et al. | 349/65 |
| 5,830,542 | * 11/1998 | Shigeno et al. | 428/1 |

FOREIGN PATENT DOCUMENTS

| | | |
|---|---|---|
| 0 470 817 A2 | 2/1992 | (EP) . |
| 0 545 705 A1 | 6/1993 | (EP) . |
| 0 737 882 A2 | 10/1996 | (EP) . |
| WO 93/16410 | 8/1993 | (WO) . |
| WO 95/34009 | 12/1995 | (WO) . |

* cited by examiner

*Primary Examiner*—William L. Sikes
*Assistant Examiner*—Tarifur R. Chowdhury
(74) *Attorney, Agent, or Firm*—Sonnenschein, Nath & Rosenthal

(57) ABSTRACT

A reflective display device includes a panel, a light guide plate and a light source. The panel is provided with a transparent first substrate lying on the side of the external incident light, a second substrate joined to the first substrate with a predetermined gap therebetween and lying on the reflection side, a guest-host liquid crystal layer held in the gap between the substrates, and electrodes provided on each substrate for applying a voltage to the guest-host liquid crystal layer. The light guide plate is composed of a transparent material and is arranged on the outside of the first substrate. The light source is arranged on the end of the light guide plate and generates illumination light as required. The light guide plate normally transmits external light onto the first substrate and emits the external light reflected from the second substrate, and also, as required, guides illumination light onto the first substrate and emits the illumination light reflected from the second substrate.

13 Claims, 18 Drawing Sheets

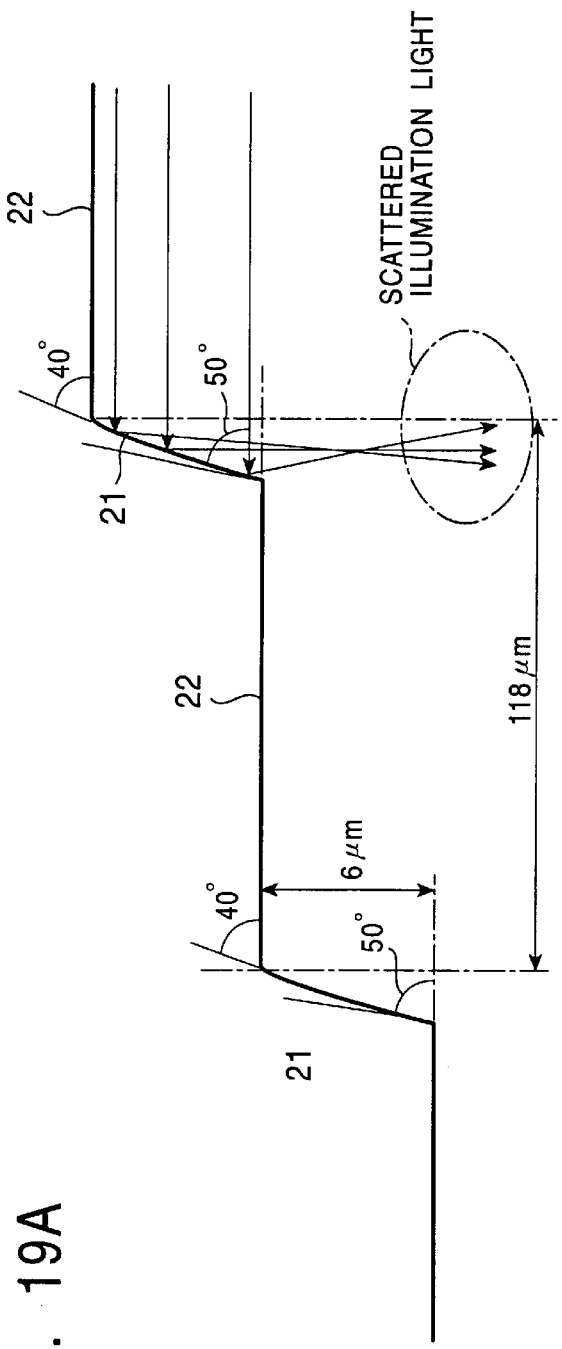
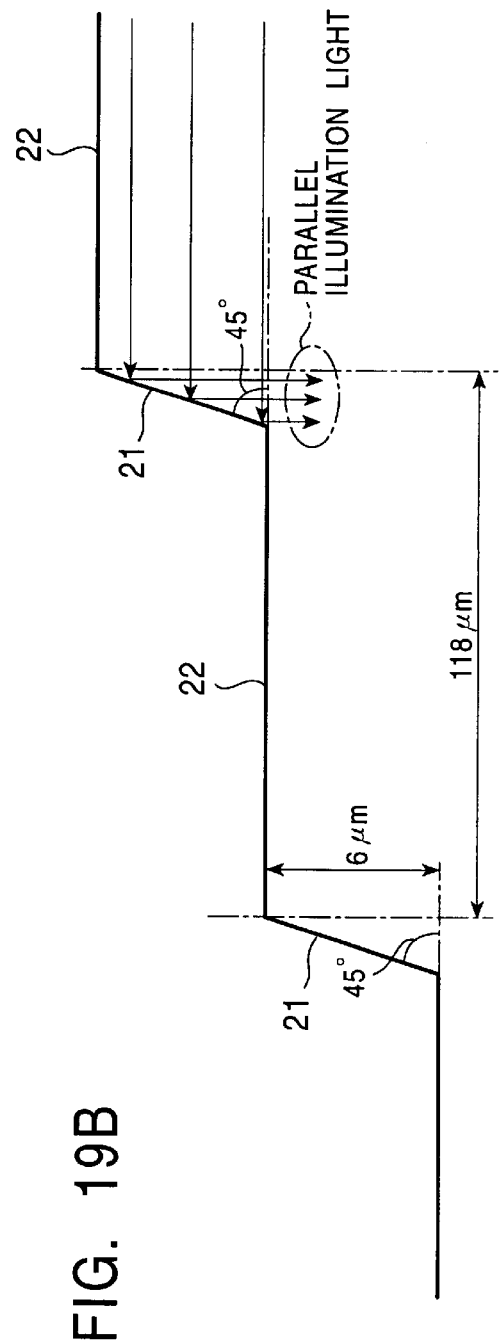
FIG. 19A
FIG. 19B

REFLECTIVE LIQUID CRYSTAL DISPLAY DEVICE WITH A PANEL, A LIGHT GUIDE PLATE AND POLARIZING PLATE

BACKGROUND OF THE INVENTION

1. Field of the Invention

The present invention relates to a reflective display device to perform a display by using external light such as natural light, and more specifically, it relates to an illuminating structure of a reflective display device, which is used as an auxiliary when external light is scarce.

2. Description of the Related Art

Among current various modes of display devices, mainly adopted are a TN mode or an STN mode in which a nematic liquid crystal having a twisted or super twisted alignment is used. However, these modes require a pair of polarizers for operation, and because of the light absorption thereof, they have a low transmittance, incapable of achieving a bright display screen. In addition to the above modes, a guest-host mode which uses a dichroic dye has been developed. A liquid crystal display device having a guest-host mode takes advantage of the anisotropy of the absorption coefficient of the dichroic dye added to the liquid crystal, in order to perform the display. By using a rod-shaped dichroic dye, the alignment direction of the dye changes as the molecular alignment of the liquid crystal is changed by applying a voltage to the electric field since the molecules of the dye are aligned in parallel to the molecules of the liquid crystal. The dye does or does not develop a color depending on the direction, and therefore by applying a voltage, the coloring mode of the liquid crystal display device can be switched.

FIG. 5A and FIG. 5B show a HEILMEIER type guest-host liquid crystal display device. FIG. 5A shows the state in the absence of an applied voltage, while FIG. 5B shows the state in the presence of an applied voltage. This liquid crystal display device includes a p-type dye and a nematic liquid crystal having a positive dielectric anisotropy ($N_p$ liquid crystal). The p-type dichroic dye having an absorption axis which is substantially parallel to the molecular axis, strongly absorbs the polarization component Lx which is parallel to the molecular axis, and hardly absorbs the polarization component Ly which is perpendicular to it. In the state shown in FIG. 5A when no voltage is applied, the polarization component Lx included in the incident light is strongly absorbed by the p-type dye, resulting in the coloring of the liquid crystal display device. On the other hand, in the state shown in FIG. 5B when a voltage is applied, the $N_p$ liquid crystal having a positive dielectric anisotropy rises in response to the electric field and accordingly the p-type dye is perpendicularly aligned. Therefore, the polarization component Lx is only slightly absorbed, resulting in the liquid crystal display device being substantially colorless. The other polarization component Ly included in the incident light is hardly absorbed by the dichroic dye whether the state of the voltage is being applied or not being applied. Accordingly, in the HEILMEIER type guest-host liquid crystal display device, a polarizer is provided beforehand to remove the other polarization component Ly for improving the contrast.

Although the guest-host liquid crystal display device shown in FIG. 5 is a transmissive type, a reflective liquid crystal display device is also known. For example, a reflective guest-host liquid crystal display device, as shown in FIG. 6, has been proposed, in which a polarizer is removed on the side of the incident light, while a quarter-wavelength plate and a reflector are provided on the emission side. In this device, the polarization directions of the two polarizing components Lx and Ly which are orthogonal to each other are rotated by 90 degrees at both incident light and reflected light paths by the quarter-wavelength plate in order to exchange the polarizing components with each other. Therefore, in the off-state (absorption state) shown in FIG. 6A, individual polarizing components Lx and Ly are absorbed either at the incident light path or at the reflected light path. In the on-state (transmission state) shown in FIG. 6B, both polarizing components Lx and Ly are hardly absorbed. Thus, the utilization efficiency of the incident light can be improved.

In the transmissive display device shown in FIG. 5, a panel holding a liquid crystal as an electro-optical material is provided between a pair of transparent electrodes, and a light source (backlight) for supplying illumination light is arranged on the rear of the panel. The image is viewed from the front of the panel. A backlight is essential to the transmissive type, and, for example, a cold cathode fluorescent tube or the like is used. Accordingly, from the viewpoint of the display device as a whole, the backlight consumes most of the electric power, which is unsuitable for displays of portable apparatuses. On the other hand, in the reflective type shown in FIG. 6, a reflector is arranged on the rear of the panel. External light such as natural light enters from the front and the image is viewed also from the front of the panel by making use of the reflected light. Differing from the transmissive type, the reflective type does not use a light source for supplying illumination light in the back, resulting in a relatively low rate of electric power consumption, which is suitable for displays of portable apparatuses. However, in the reflective display device, the image cannot be viewed in an environment where external light is scarce, for example, at night, which remains to be a problem to be solved.

SUMMARY OF THE INVENTION

Accordingly, it is an object of the present invention to provide a reflective display device provided with an illumination structure which enables the viewing of an image in a dark environment while not spoiling the image quality in a bright environment.

A reflective display device, in accordance with the present invention, includes a panel, a light guide plate and a light source as fundamental components. The panel includes a transparent first substrate lying on the side of the external incident light, a second substrate joined to the first substrate with a predetermined gap therebetween and lying on the reflection side, an electro-optical material held in the gap, and an electrode provided on at least one of the first substrate and the second substrate for applying a voltage to the electro-optical material. The light guide plate is composed of a transparent material and arranged on the outside of the first substrate. The light source is arranged on the end of the light guide plate and generates illumination light as required. Notably, the light guide plate normally transmits external light onto the first substrate and emits the light reflected from the second substrate, and also as required guides illumination light onto the first substrate and emits the illumination light reflected from the second substrate.

Preferably, the light guide plate includes a planar section divided into bands and an inclined step lying between each band of the planar section. The thickness of the light guide plate decreases stepwise from the end where the light source lies toward the front. The light guide plate reflects the illumination light guided forward at each step so as to guide it onto the first substrate, and emits the illumination light reflected from the second substrate through the planar section. In such a case, the step of the light guide plate inclines from 40 to 50 degrees toward the planar section. Further, the panel may use a guest-host liquid crystal layer, including a liquid crystal as a host to which a dichroic dye is added as a guest, as the electro-optical material. In such a case, the panel includes a reflecting layer lying on the side of the second substrate for scattering and reflecting external light, and a quarter-wavelength layer provided between the guest-host liquid crystal layer and the reflecting layer. Or, the panel may include a polarizing plate provided on the side of the first substrate and may use a liquid crystal layer, which functions as a quarter-wavelength plate in response to the state of an applied voltage, as the electro-optical material. In such a case, a quarter-wavelength plate is provided between the polarizing plate and the liquid crystal layer, and the liquid crystal layer includes a nematic liquid crystal layer having a positive dielectric anisotropy and a twisted alignment, functions as a quarter-wavelength plate in the absence of an applied voltage, and does not function as a quarter-wavelength plate in the presence of an applied voltage.

Also preferably, the light guide plate and the panel are joined to each other with a transparent intervening layer therebetween, for suppressing undesirable reflection of illumination light and external light at the interface between the light guide plate and the panel by appropriately setting a refractive index of the intervening layer. The intervening layer is composed of, for example, a transparent resin having adhesion. In such a case, the light guide plate may be provided with a groove on the back surface thereof for preventing the transparent adhesive resin from leaking out when the back surface of the light guide plate and the surface of the panel are joined to each other. Also preferably, the reflective display device includes a collimating means for collimating the illumination light radiating from the light source and leading it perpendicularly onto the end of the light guide plate. In such a case, the light source is, for example, semicylindrically formed and arranged facing the end of the light guide plate, and the collimating means corresponds to a semicylindrical collimator lens arranged between the light source and the light guide plate. Also preferably, a polarizing plate is provided between the light source and the light guide plate for converting unpolarized light radiating from the light source into linearly polarized light, leading it onto the light guide plate and suppressing undesirable scattering of illumination light inside the light guide plate. In such a case, the polarizing plate converts illumination light into linearly polarized light which is parallel to or perpendicular to the light guide plate. On the other hand, the electro-optical material includes a liquid crystal which can be controlled in the alignment direction parallel to or orthogonally to the polarization direction of the illumination light converted into linearly polarized light. Also preferably, the step of the light guide plate includes a curved inclined area for reflecting illumination light diffusively so as to lead it onto the first substrate. Or, each step of the light guide plate may be formed so as to have a different angle of inclination for reflecting illumination light in accordance with the angle of inclination and leading it onto the first substrate at a different angle. Also preferably, the light guide plate includes a trapezoidal section divided into bands and an inclined step lying between each band of the trapezoidal section, and each band of the trapezoidal section includes a curved lens area. The light guide plate reflects the illumination light radiating from the light source at each step so as to guide it onto the first substrate and emits the illumination light reflected from the second substrate through the lens area of each band of the trapezoidal section.

In accordance with the present invention, the light guide plate is arranged on the surface of the reflective panel, and the light source is arranged on the end of the light guide plate. In a dark environment, the light source is turned on and the illumination light enters into the panel through the light guide plate for displaying the image. In a bright environment, the light source is turned off and external light is directly used through the transparent light guide plate for displaying the image. The light guide plate is basically transparent and thus it will not prevent the viewer from seeing the image even in a bright environment. As described above, in accordance with the present invention, the light source is turned on only when required, thus the electric power consumed in the display as a whole can be largely reduced, which is suitable for displays of portable apparatuses. As an alternative to the structure in accordance with the present invention, a flat-type backlight source may be arranged in the rear of the panel in order to perform an auxiliary illumination in a dark environment. However, in such a case, it is required either to provide an opening onto the reflecting layer included in the panel in order to transmit the illumination light from the back to the front, or to provide a transflector-type structure to the reflecting layer. This will lower the reflection efficiency and sacrifice the brightness of the displayed image in a bright environment. In the present invention, it is possible to provide an auxiliary illumination in a dark environment without sacrificing the display brightness in a bright environment.

Further, in accordance with the present invention, various means have been tried in order to improve the utilization efficiency of the illumination light radiating from the light source and to enhance the display quality. For example, an intervening layer for matching is provided between the light guide plate and the first substrate in order to suppress undesirable reflection of illumination light at the interface between the light guide plate and the first substrate. Also, a collimating means such as a collimator is provided between the light source and the end of the light guide plate in order to lead illumination light efficiently onto the light guide plate. Also, a polarizing plate is inserted between the light source and the light guide plate in order to suppress undesirable scattering of illumination light inside the light guide plate. Further, since the step of the light guide plate is formed as a curved inclined area, illumination light is diffusively led onto the first substrate, resulting in an improvement in the visual characteristics. Or, each step is formed so as to have a different angle of inclination and leads illumination light onto the first substrate at a different angle, and thus the visual characteristics can be improved. Furthermore, by providing the planar section (trapezoidal section) divided into bands with a curved lens area on the light guide plate, a microlens is provided. The microlens can suppress the interference fringes caused by the periodical prismatic structure of the light guide plate, enabling a high-quality display.

BRIEF DESCRIPTION OF THE DRAWINGS

FIGS. 8A–8C are schematic diagram showing the light guide plate used in the third embodiment, wherein FIG. 8A is a plan view, FIG. 8B is a sectional view and FIG. 8C is an enlarged sectional view;

FIGS. 19A–19B are partial sectional views of the important part of a reflective display device as a sixth embodiment of the present invention;

DESCRIPTION OF THE PREFERRED EMBODIMENT

The preferred embodiments of the present invention will be explained with reference to the attached drawings.

Figure 1:
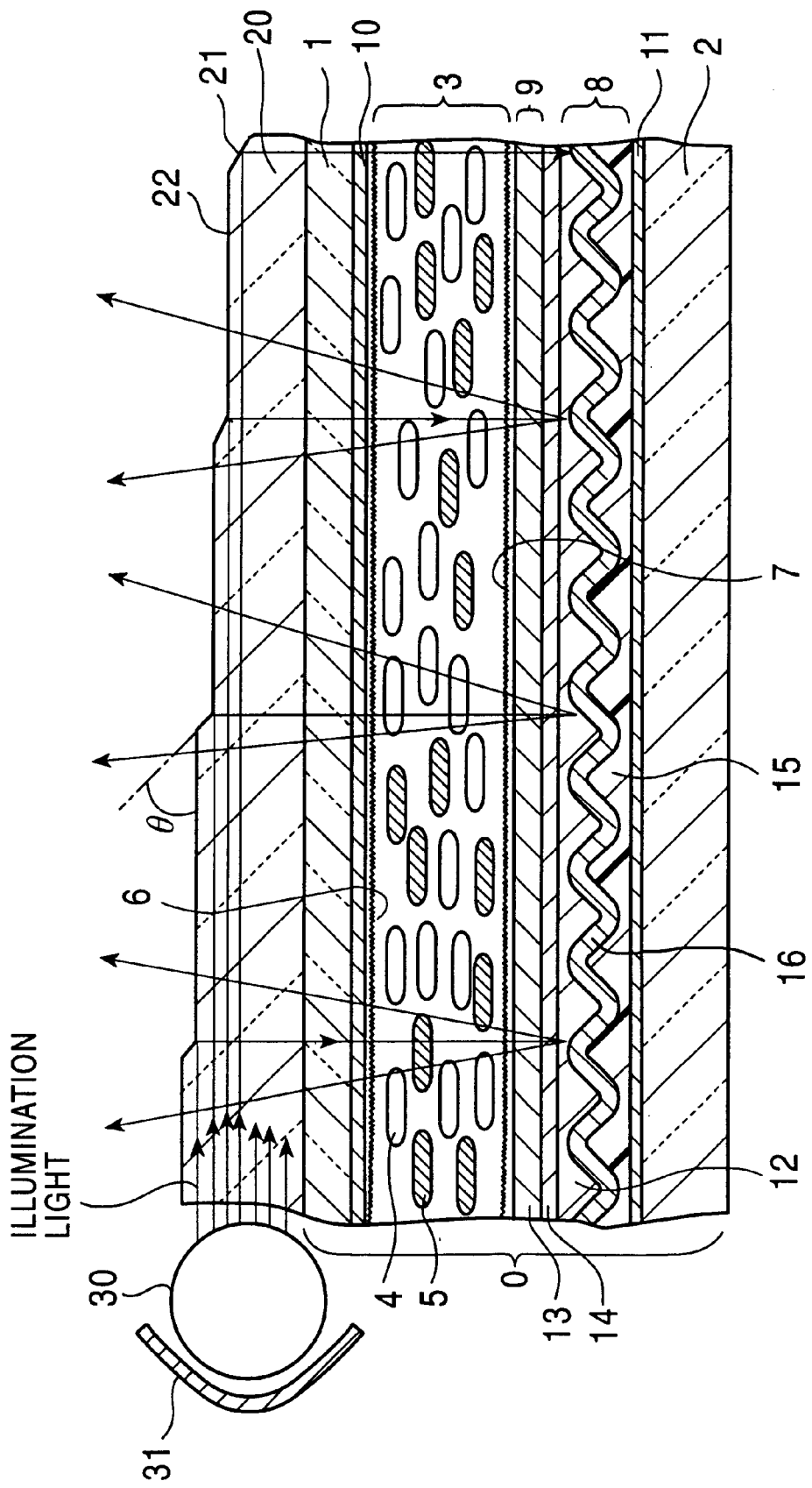
FIG. 1 is a schematic partial sectional view which shows a reflective display device, as a first embodiment of the present invention, in use in a dark environment.

FIG. 1 is a schematic partial section view which shows a reflective display device as a first embodiment of the present invention. As shown in the drawing, the reflective display device includes a panel 0, a light guide plate 20 and a light source 30 as fundamental components. The panel 0 comprises a transparent first substrate 1 lying on the side of the external incident light, a second substrate 2 joined to the first substrate 1 with a predetermined gap therebetween and lying on the reflection side, an electro-optical material held between both substrates 1 and 2, and electrodes 10 and 11 provided on the first substrate 1 and the second substrate 2 respectively for applying a voltage to the electro-optical material. The light guide plate 20 is composed of the injection-molded piece of a transparent material, for example, an acrylic resin, and arranged on the outside of the first substrate 1. Further, in accordance with the embodiment of the present invention, although the light guide plate 20 and the first substrate 1 are separately formed, they may be integrally molded. The light source 30 is arranged on the end of the light guide plate 20 and generates illumination light as required. The light source 30 is composed of, for example, a cold cathode fluorescent tube, and is a so-called edge light. In order to improve the illumination efficiency of the edge light, a reflecting mirror 31 is provided behind the cylindrical light source 30. In such a structure, the light guide plate 20 normally transmits external light onto the first substrate 1 and emits the external light reflected from the second substrate 2, and also as required guides illumination light onto the first substrate 1 and emits the illumination light reflected from the second substrate 2.

In accordance with the embodiment of the present invention, the light guide plate 20 includes a planar section 22 divided into bands, and an inclined step 21 lying between each band of the planar section 22. The thickness of the light guide plate decreases stepwise from the end where the light source 30 lies toward the front. The light guide plate 20 totally reflects the illumination light directed forward at each step 21 so as to guide it onto the first substrate 1, and emits the illumination light reflected from the second substrate 2 through each band of the planar section 22. The step 21 of the light guide plate 20 inclines from 40 to 50 degrees toward the planar section 22. In the drawing, the angle of inclination is shown as θ. FIG. 1 shows the reflective display device in use in a dark environment, where the light source constituting the edge light is turned on. The illumination light radiating from the light source 30 illuminates the panel 0 through the light guide plate 20. That is to say, the illumination light advancing horizontally in the light guide plate is totally reflected at the step 21 and enters into the panel 0, while the illumination light reflected from the second substrate 2 is emitted through the planar section 22 of the light guide plate 20.

The panel 0 includes a guest-host liquid crystal layer 3, as the electro-optical material, which comprises a liquid crystal 4 as a host to which a dichroic dye 5 is added as a guest. However, the present invention is not limited to a guest-host liquid crystal layer, and other materials can also be used as the electro-optical material. The panel 0 includes a reflecting layer 8 and a quarter-wavelength layer 9. The reflecting layer 8 lies on the side of the second substrate 2 for scattering and reflecting external light. The quarter-wavelength layer 9 is provided between the guest-host liquid crystal layer 3 and the reflecting layer 8. The structure of the panel 0 will be explained in detail, as follows. The guest-host liquid crystal layer 3 includes a mixture of a nematic liquid crystal 4 and a dichroic dye 5 and is homogeneously aligned by upper and lower alignment layers 6 and 7. Also, a reflecting layer 8 is provided on the side of the second substrate 2 in the gap between the substrates 1 and 2. Further, the quarter-wavelength layer 9 is provided between the guest-host liquid crystal layer 3 and the reflecting layer 8. Electrodes 10 and 11 are formed on the sides of the first substrate 1 and the second substrate 2 respectively for applying a voltage to the guest-host liquid crystal layer 3. In accordance with the embodiment of the present invention, the upper electrode 10 is formed on the inner surface of the first substrate 1 and the lower electrode 11 is formed on the inner surface of the second substrate 2.

The reflecting layer 8 has a corrugated surface and scatters light. Accordingly, its paper-white appearance is suitable for the display background and since it reflects the incident light with a relatively wide angle range, the viewing angle range is enlarged, and thus the display is easily viewed as well as the brightness of the display being increased. In accordance with the embodiment of the present invention, a transparent flattening layer 12 is provided between the reflecting layer 8 and the quarter-wavelength layer 9 for compensating the corrugation. The quarter-wavelength layer 9 is composed of a polymeric liquid crystal material 13 which is aligned uniaxially along the surface of the flattening layer 12. In order to uniaxially align the polymeric liquid crystal material 13, an underlying alignment layer 14 is provided between the flattening layer 12 and the quarter-wavelength layer 9. The reflecting layer 8 includes a resin layer 15 having a corrugation and a metal film 16 formed on the surface thereof, composed of, for example, aluminum. The resin layer 15 is a photosensitive resin layer whose corrugation is patterned by means of photolithography.

The photosensitive resin layer 15 formed on the surface of the second substrate 2 is composed of, for example, a photo resist, which is applied to the entire surface of the substrate. It is exposed to light through a given mask and, for example, is formed into a cylindrical pattern. Next, by heating to melt, the corrugation is formed stably. On the surface of the corrugation formed as described above, a metal film 16, composed of aluminum or the like having a predetermined thickness and a good reflectance, is provided. If the depth of the corrugation is set at several $\mu$m, a good light scattering property is obtained and the reflecting layer 8 will have a white color. On the surface of the reflecting layer 8, the flattening layer 12 is provided to compensate the corrugation. It is preferable that the flattening layer 12 is composed of a transparent organic substance, for example, an acrylic resin or the like. By providing the flattening layer 12, the underlying alignment layer 14 can be stably formed and rubbed. Thereby, the quarter-wavelength layer 9 is precisely formed. The alignment layer 7 is formed on the quarter-wavelength layer 9. The alignment layer 7 provided on the side of the second substrate 2 and the alignment layer 6 provided on the side of the first substrate 1 align the guest-host liquid crystal layer 3 homogeneously (horizontally). Alternatively, the guest-host liquid crystal layer 3 may be aligned homeotropically (perpendicularly).

Next, the operation for performing the black-and-white display by using the reflective guest-host liquid crystal display device will be explained briefly. In the absence of an applied voltage, the nematic liquid crystal 4 is aligned horizontally and the dichroic dye 5 is similarly aligned. When the illumination light entering from the upper first substrate 1 advances to the guest-host liquid crystal layer 3, a component, of the illumination light, having a plane of vibration which is parallel to the major axes of the molecules of the dichroic dye 5, is absorbed by the dichroic dye 5. Another component, having a plane of vibration which is perpendicular to the major axes of the molecules of the dichroic dye 5, passes through the guest-host liquid crystal layer 3, and is circularly polarized by the quarter-wavelength layer 9 provided on the surface of the lower second substrate 2, and then it is reflected from the reflecting layer 8. At this stage, the polarization of the reflected light is reversed, and after passing through the quarter-wavelength layer 9 again, the component will have a plane of vibration which is parallel to the major axes of the molecules of the dichroic dye 5. Since the component is absorbed by the dichroic dye 5, a substantially black display is obtained. On the other hand, in the presence of an applied voltage, the nematic liquid crystal 4 is aligned perpendicularly along the direction of the electric field, and the dichroic dye 5 is similarly aligned. The illumination light entering from the upper first substrate 1 passes through the guest-host liquid crystal layer 3 without being absorbed by the dichroic dye 5, and is reflected from the reflecting layer 8 without being substantially affected by the quarter-wavelength layer 9. The reflected light passes though the quarter-wavelength layer 9 again and is emitted without being absorbed by the guest-host liquid crystal layer 3. Accordingly, a white display is obtained.

Figure 2:
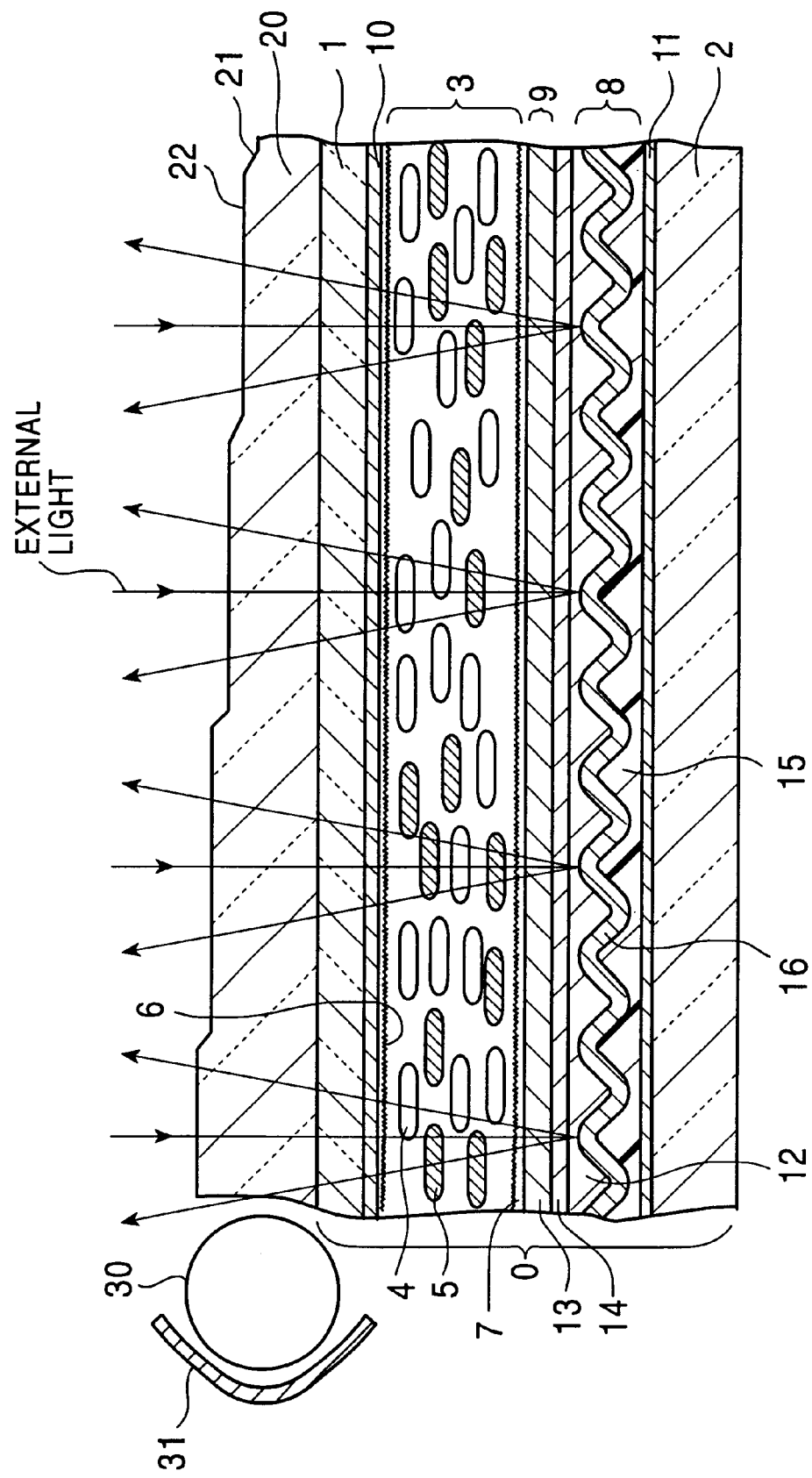
FIG. 2 is a schematic partial sectional view which shows the reflective display device as the first embodiment of the present invention, in use in a bright environment.

FIG. 2 shows the reflective guest-host liquid crystal display device shown in FIG. 1 in use in a bright environment. In a bright environment, because of an ample supply of external light such as natural light, the display is performed by making use of it. Therefore, the light source 30 is turned off. Thus the electric power consumed by the display device as a whole can be reduced. The light guide plate 20 transmits the light entered from the side of the viewer onto the first substrate 1 and emits the light reflected from the second substrate 2 through the planar section 22. Since the light guide plate 20 is basically transparent, it does not hinder the viewer from seeing the display.

Figure 3A:
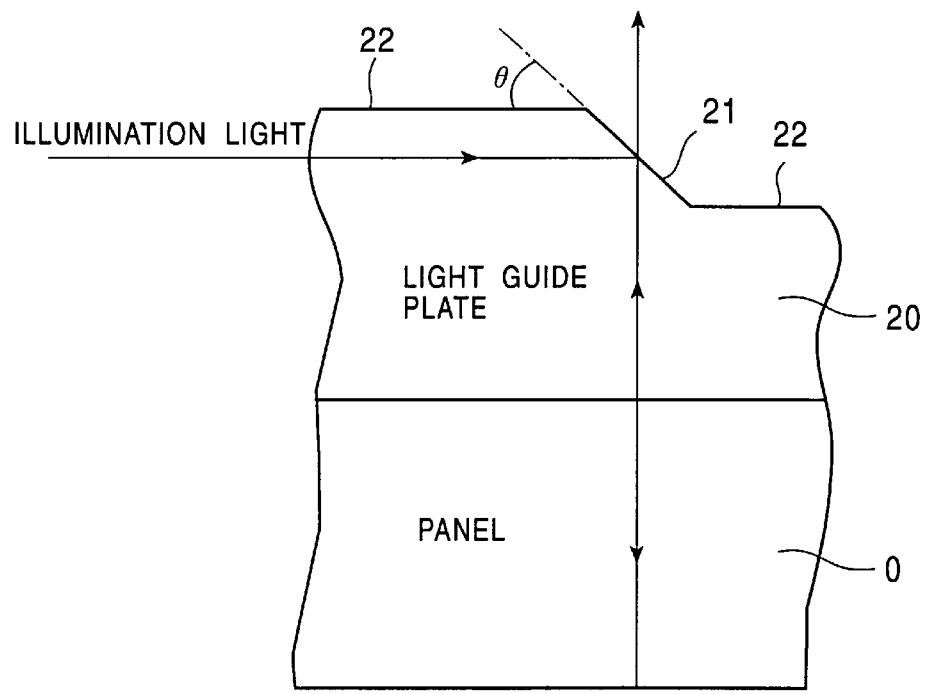
FIGS. 3A–3B are schematic representation showing the optical properties of the light guide plate included in the first embodiment shown in FIG. 1 and FIG. 2.

FIG. 3 is a schematic representation showing the optical properties of the light guide plate 20. As shown in FIG. 3A, the illumination light horizontally guided from the end of the light guide plate 20 is totally reflected at substantially a right angle from the step 21 and is guided to the side of the panel 0. By setting the angle of inclination $\theta$ of the step 21 appropriately, it is possible to guide the substantially total volume of the illumination light to the side of the panel 0 without leaking light. The angle of inclination $\theta$ depends on the refractive index of the transparent material constituting the light guide plate 20 and is generally set in the range from 40 to 50 degrees.

Figure 3B:
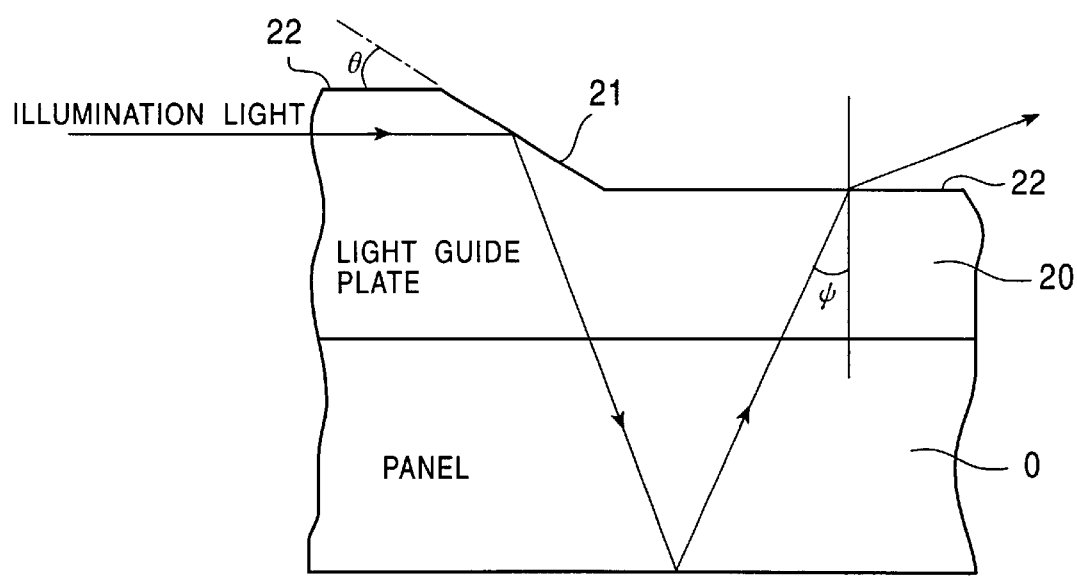

As shown in FIG. 3B, the illumination light guided to the side of the panel 0 through the step 21 is reflected from the panel 0 and is emitted through the planar section 22 of the light guide plate 20. In such a case, it is preferable to set the angle of inclination $\theta$ of the step 21 so that the angle $\Psi$ between the line perpendicular to the planar section 22 of the light guide plate 20 and the reflected light is smaller than the angle of total reflection determined by the refractive index of the light guide plate 20. Thus the illumination efficiency is improved because the substantially total volume of the illumination light is emitted through the planar section 22 of the light guide plate 20 without being totally reflected. Generally, in order to satisfy the above condition, the angle of inclination $\theta$ of the step 21 is set at 40 to 50 degrees.

Figure 4:
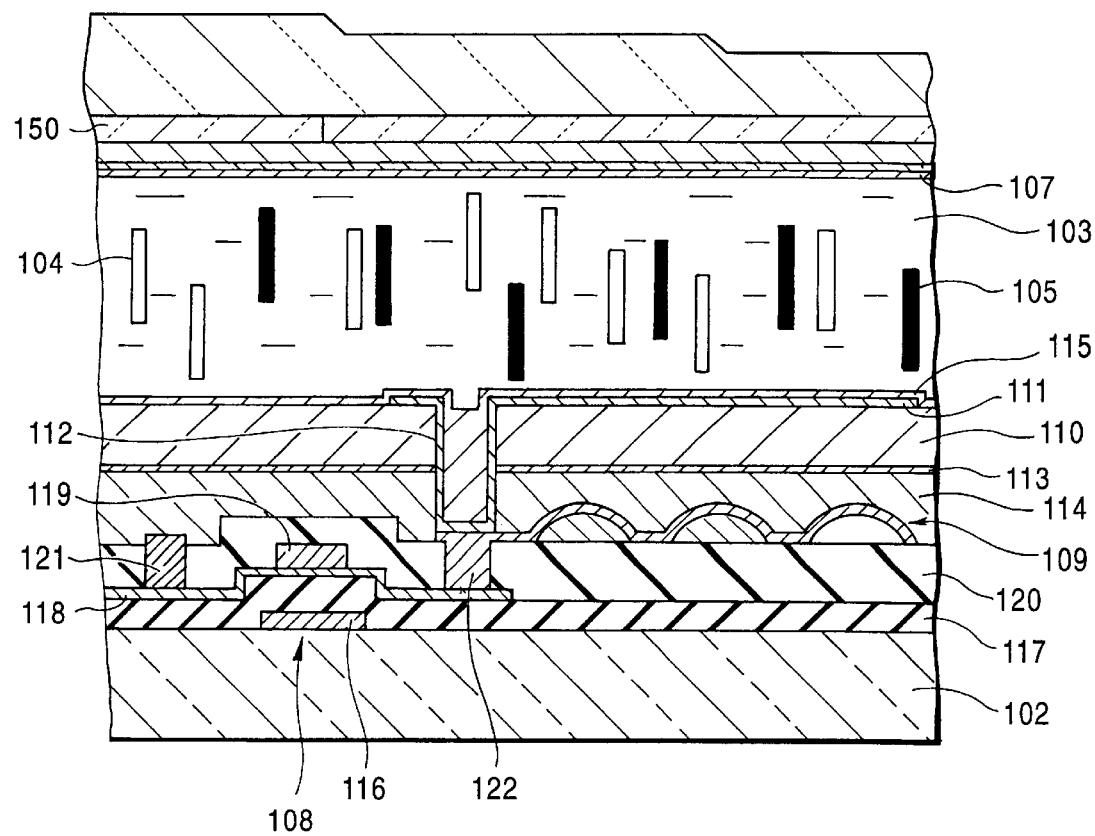
FIG. 4 is a schematic partial sectional view which shows a reflective display device as a second embodiment of the present invention.
Figure 5A:
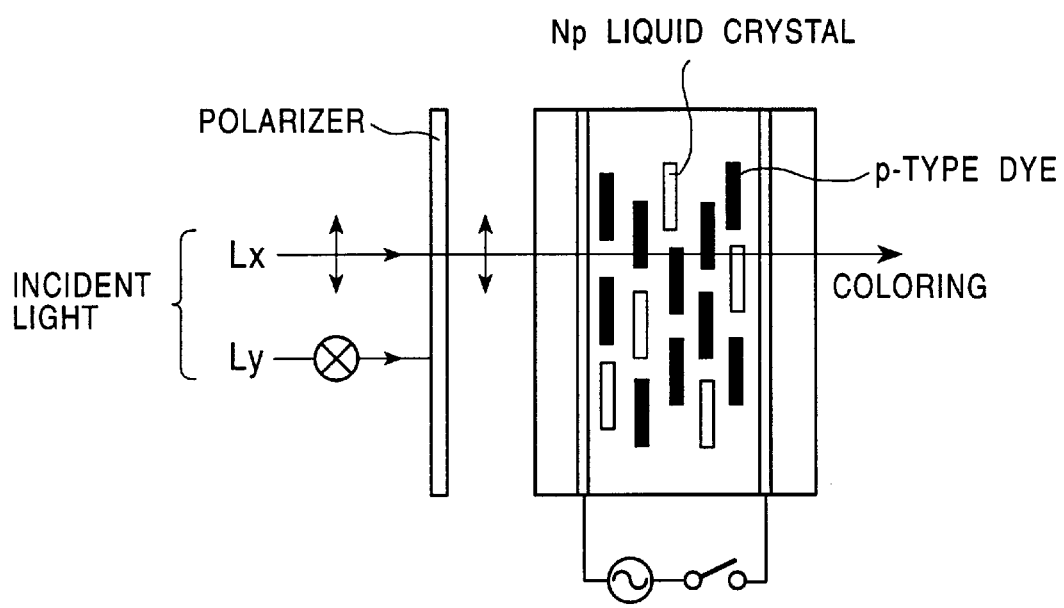
FIGS. 5A–5B are schematic diagrams showing examples of conventional transmissive display devices in the absense of voltage in the presence of voltage respectively.
Figure 5B:
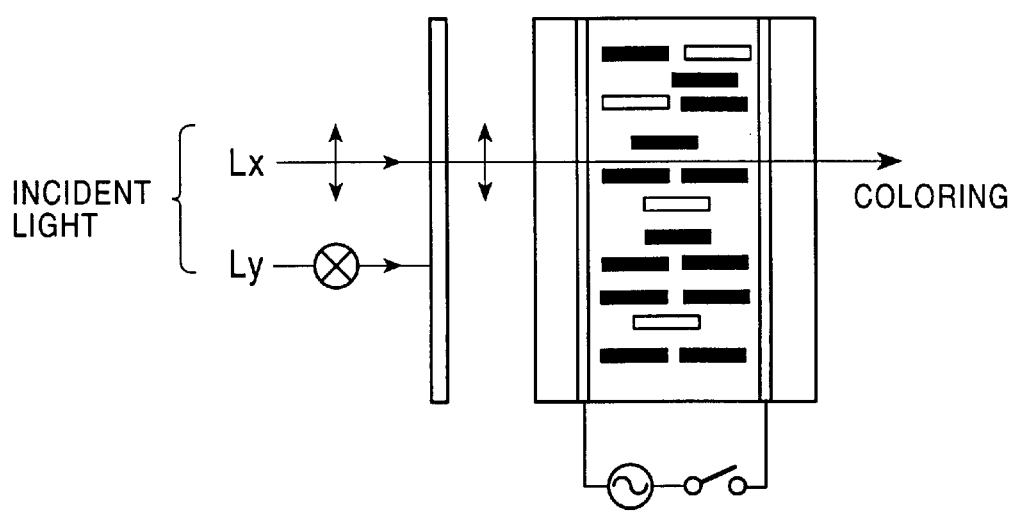
Figure 6A:
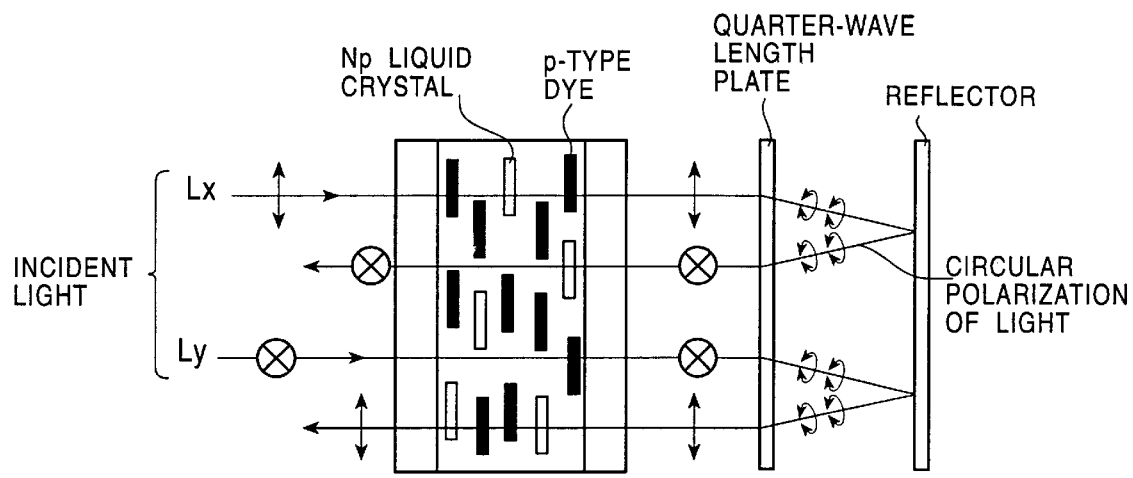
FIGS. 6A–6B are schematic diagrams showing examples of conventional reflective display devices in off state and on state respectively.
Figure 6B:
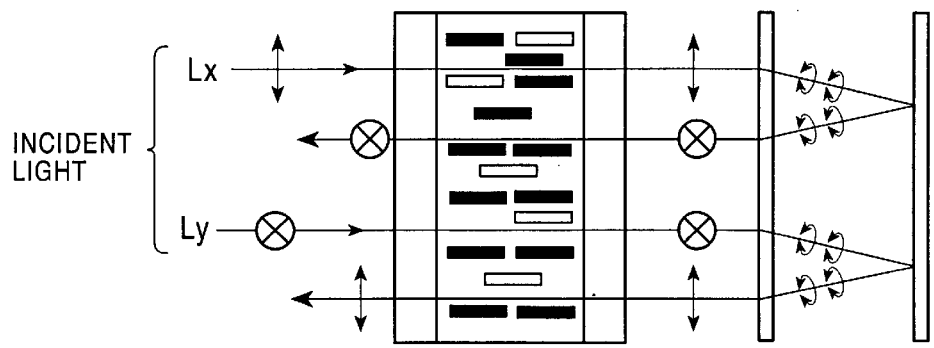

FIG. 4 is a schematic partial sectional view which shows a reflective display device as a second embodiment of the present invention. The embodiment also has a basically flat structure including a light guide plate deposited on a panel. Notably, the panel is an active matrix type. An upper substrate 101 lying on the side of the incident light in contact with the light guide plate is composed of a transparent material such as glass. On the other hand, a lower substrate 102 lying on the reflection side is not necessarily composed of a transparent material. A guest-host liquid crystal layer 103 is provided between the pair of substrates 101 and 102. The guest-host liquid crystal layer 103 contains mainly a nematic liquid crystal 104 having a negative dielectric anisotropy and contains, at a given ratio, a dichroic dye 105. On the inner surface of the upper substrate 101, a counter electrode 106 and an alignment layer 107 are provided. A color filter 150 is also provided on it. The alignment layer 107 is composed of, for example, a polyimide film and vertically aligns the quest-host liquid crystal layer 103. On the lower substrate 102, at least, a switching element composed of a thin film transistor 108, a reflecting layer 109, a quarter-wavelength layer 110 and a pixel electrode 111 are provided. The quarter-wavelength layer 110 is formed on the thin film transistor 108 and the reflecting layer 109 and is also provided with a contact hole 112 which is connected with the thin film transistor 108. The pixel electrode 111 is formed on the quarter-wavelength layer by patterning. Therefore, it is possible to sufficiently impress the electric field to the guest-host liquid crystal layer 103 between the pixel electrode 111 and the counter electrode 106. The pixel electrode 111 is electrically connected with the thin film transistor 108 through the contact hole 112 which passes through the quarter-wavelength layer 110.

The individual components will be explained in detail, as follows. In accordance with the embodiment of the present invention, the quarter-wavelength layer 110 is composed of a polymeric liquid crystal layer which is aligned uniaxially. In order to uniaxially align the polymeric liquid crystal layer, an underlying alignment layer 113 is provided. In order to compensate for the unevenness of the thin film transistor 108 and the reflecting layer 109, a flattening layer 114 is provided, and the above-mentioned underlying alignment layer 113 is formed on the flattening layer 114. The quarter-wavelength layer 110 is also formed on the surface of the flattening layer 114. In such a case, the pixel electrode 111 is connected with the thin film transistor 108 through the contact hole 112 passing through the quarter-wavelength layer 110 and the flattening layer 114. The reflecting layer 109 is fragmented corresponding to the individual pixel electrodes 111. Each fragmented part is connected with the corresponding pixel electrode 111 with the same electric potential. Owing to the structure described above, the quarter-wavelength layer 110 and the flattening layer 114 provided between the reflecting layer 109 and the pixel electrode 111 are not impressed with an electric field unnecessarily. As shown in the drawing, the reflecting layer 109 is provided with a scattering reflective surface, which prevents the regular reflection of the incident light, thus improving the image quality. The alignment layer 115 is formed so as to cover the surface of the pixel electrode 111 and is in contact with the guest-host liquid crystal layer 103 for controlling the alignment thereof. In accordance with the embodiment of the present invention, the alignment layer 115 together with the facing alignment layer 107 vertically aligns the guest-host liquid crystal layer 103. Finally, the thin film transistor 108 has a bottom-gate structure where a gate electrode 116, a gate insulating film 117, and a semiconductor thin film 118 are deposited in that order from the bottom. The semiconductor thin film 118 is composed of, for example, polycrystalline silicon and the channel area which matches with the gate electrode 116 is protected with a stopper 119 from the top. The thin film transistor 108 having the bottom-gate structure as described above is covered with a layer insulation film 120. The layer insulation film 120 has a pair of contact holes, through which a source electrode 121 and a drain electrode 122 are electrically connected with the thin film transistor 108. The electrodes 121 and 122 are formed by patterning, for example, aluminum. The drain electrode 122 and the reflecting layer 109 have the same electric potential. Also, the pixel electrode 111 is electrically connected with the drain electrode 122 through the above-mentioned contact hole 112. On the other hand, a signal voltage is supplied to the source electrode 121.

Figure 7:
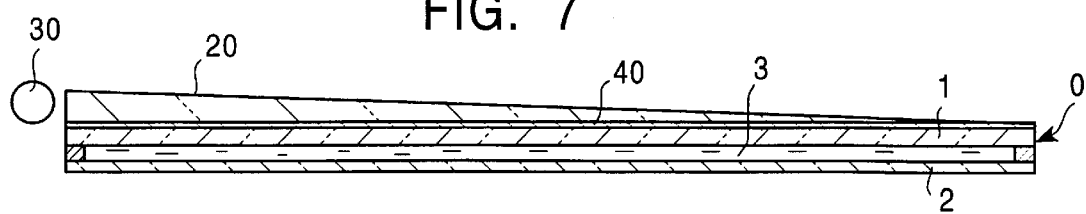
FIG. 7 is a sectional view which shows a reflective display device as a third embodiment of the present invention.

FIG. 7 is a schematic sectional view which shows a reflective display device as a third embodiment of the present invention. This has the same fundamental structure as the first embodiment of the present invention shown in FIG. 1 and the same reference numerals are assigned to the corresponding parts. Notably, the light guide plate 20 and the first substrate 1 of the panel 0 are joined to each other with a transparent intervening layer 40 therebetween. The undesirable reflection of illumination light and external light at the interface between the light guide plate 20 and the first substrate 1 is suppressed by appropriately setting a refractive index of the intervening layer 40. The intervening layer 40 may be composed of, for example, a transparent resin having adhesion. The transparent resin is applied to the surface of the first substrate 1 of the panel 0 and the light guide plate 20 is bonded thereto. Since optical matching is required to suppress the undesirable reflection, the refractive index of the resin constituting the intervening layer 40 is selected so as to be substantially the same as the refractive indices of the light guide plate 20 and the first substrate 1. For example, if the first substrate 1 is composed of glass, the refractive index of the resin constituting the intervening layer 40 is set at approximately 1.5. Also, in order not to trap air bubbles between the light guide plate 20 and the panel 0 when they are bonded together, the resin preferably has relatively low viscosity and the viscosity is adjusted, for example, to approximately 1,000 cp.

The display quality and the processibility were evaluated by changing the material for the intervening layer 40. First, for reference, the light guide plate 20 was directly arranged on the panel 0 with air therebetween. In such a case, when the illumination light radiating from the light source 30 enters vertically into the side of the panel 0, it is reflected from the interface between the lower surface of the light guide plate 20 and the air layer as well as from the interface between the air layer and the upper surface of the first substrate 1. The undesirably reflected light amounts to approximately 10% of the illumination light. Since the intensity of the undesirably reflected light is substantially the same as the amount of light reflected from the second substrate 2 of the panel 0, the display contrast is extremely lowered. Since the display contrast in this case reached approximately zero, the image shown on the panel 0 was not clearly visible. Next, water was introduced as the intervening layer 40 between the light guide plate 20 and the panel 0. That is, water having a refractive index of 1.33 was used to fill the interface between the light guide plate 20 and the panel 0 by means of capillarity so that they were optically joined together. As a result, the undesirable reflection at the interface between the light guide plate 20 and the panel 0 decreased extremely and thus a contrast which was sufficient enough to view the display was obtained. Further, an ultraviolet curing epoxy resin was used to fill the interface between the light guide plate 20 and the panel 0. The refractive index of the epoxy resin was 1.56 and most of the undesirable surface reflection was eliminated. Thereby, a high level of contrast which was adequate for practical purposes was obtained. However, the relatively high viscosity of the epoxy resin, i.e. approximately 5,000 cp, made it difficult to use it to uniformly fill the interface between the light guide plate 20 and the panel 0. Further, an ultraviolet curing epoxy resin having a viscosity of approximately 1,000 cp was used to fill the interface between the light guide plate 20 and the panel 0. Since the epoxy resin has a relatively low viscosity and a high refractive index, it could be used to uniformly fill the interface between the light guide plate 20 and the panel 0 and it could almost completely suppress the undesirable reflection.

Figure 8A:
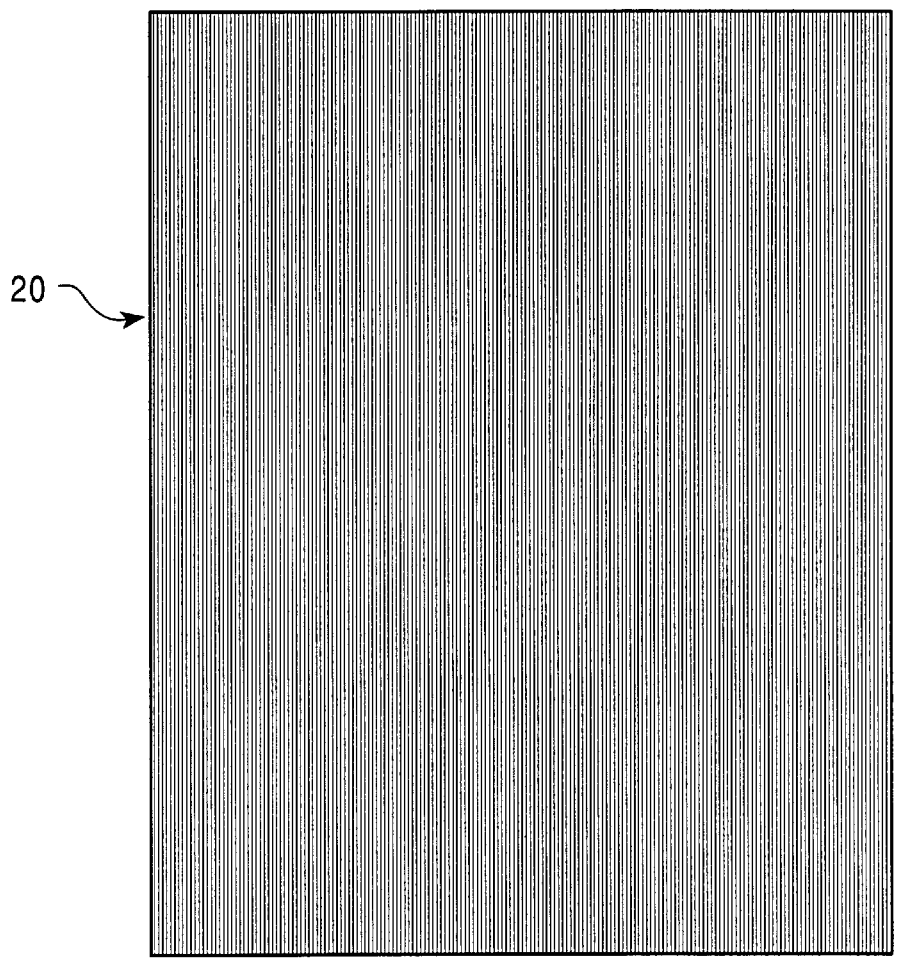
Figure 8B:
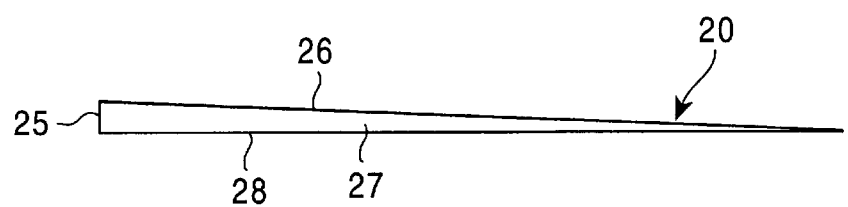
Figure 8C:
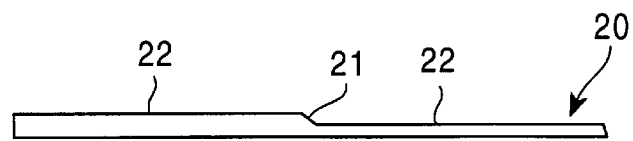

FIG. 8 shows a specific structure of the light guide plate 20 shown in FIG. 7, where FIG. 8A is a plan view, FIG. 8B is a sectional view and FIG. 8C is an enlarged sectional view. The layered light guide plate 20 is joined to the panel 0 at a lower surface 28 of the light guide plate 20. At this stage, if a bonding resin adheres to an end 25, an upper surface 26, or a side 27, the optical properties will be damaged. Therefore, it is preferable that the end 25, the upper surface 26 and the side 27 of the light guide plate 20 are protected with a tape or the like beforehand when the light guide plate 20 and the panel 0 are bonded together with an ultraviolet curing resin. By removing the tape after the light guide plate 20 and the panel 0 have been bonded together through the radiation of ultraviolet rays, it is possible to prevent the bonding resin from unnecessarily adhering. After bonding, the light guide plate 20 and the panel 0 are integrated.

Figure 9:
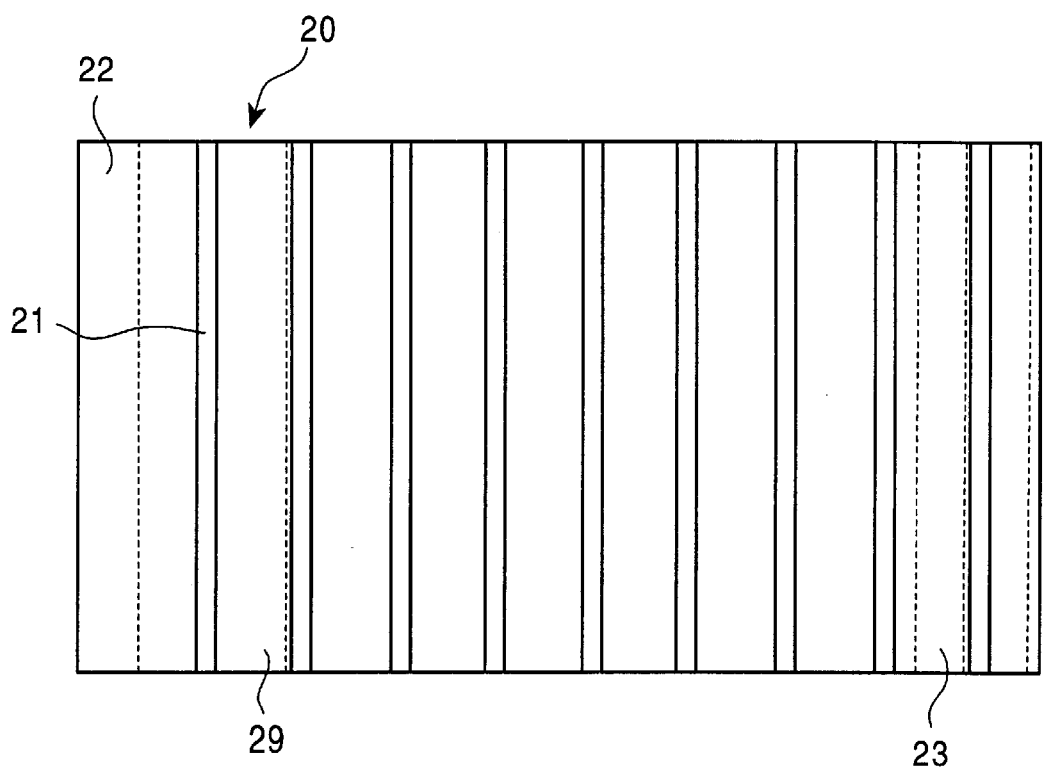
FIG. 9 is a plan view showing a light guide plate used in a variation to the third embodiment.
Figure 10:
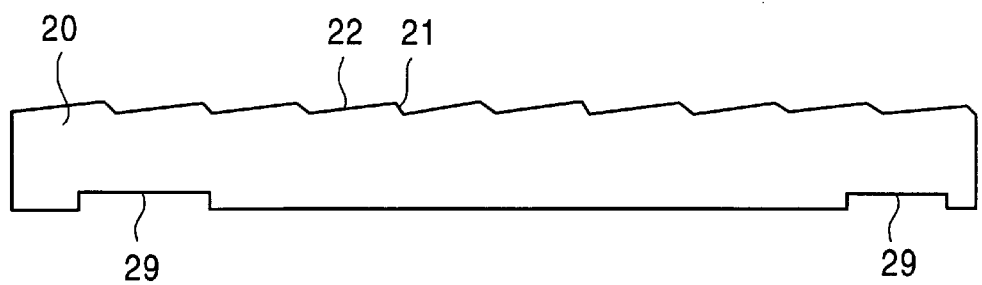
FIG. 10 is a sectional view showing the light guide plate of the same.

When the light guide plate is provided on the front surface of the panel, if an air layer intervenes between the light guide plate and the panel, nearly 10% of the incident light is reflected because a refractive index between the air and the light guide plate disagrees with that between the air and the panel. Since the reflected light does not participate in the electro-optical switching of the panel, it significantly decreases the contrast of the reflective display device. Therefore, in the third embodiment described above, in order to prevent the interfacial reflection, the light guide plate and the panel are bonded with a transparent resin which has a refractive index close to those of them. There is, however, a possibility that an excess adhesive may leak out of the gap between the light guide plate and the panel when they are bonded to each other, and if it should stick to other components, the reflective display device will have a poor appearance. The structure for preventing the adhesive from leaking out will be described as follows. FIG. 9 is a plan view of an improved light guide plate and FIG. 10 is a sectional view of the same. The light guide plate 20 is fabricated by cutting an acrylic plate which is 90 mm by 120 mm in size and has a thickness of 3.0 mm with a diamond cutter having an inclination of 135 degrees. Thus, steps 21 having an inclination angle of 45 degrees are formed with a distance of 200 μm on the surface of the light guide plate 20. A planar section 22 is formed between the adjacent steps 21. The planar section 22 inclines slightly and the light guide plate 20 as a whole has a given thickness. Prior to the cutting fabrication, two grooves 29 are formed on the back surface of the acrylic plate. Each groove 29 is parallel to the step 21, and one is arranged on the side of the light source and another is arranged on the side opposite the light source. The groove 29 is formed, for example, 1 mm away from the end of the light guide plate 20, and has a width of, for example, 1 mm, and a depth of, for example, 0.2 mm.

Figure 11:
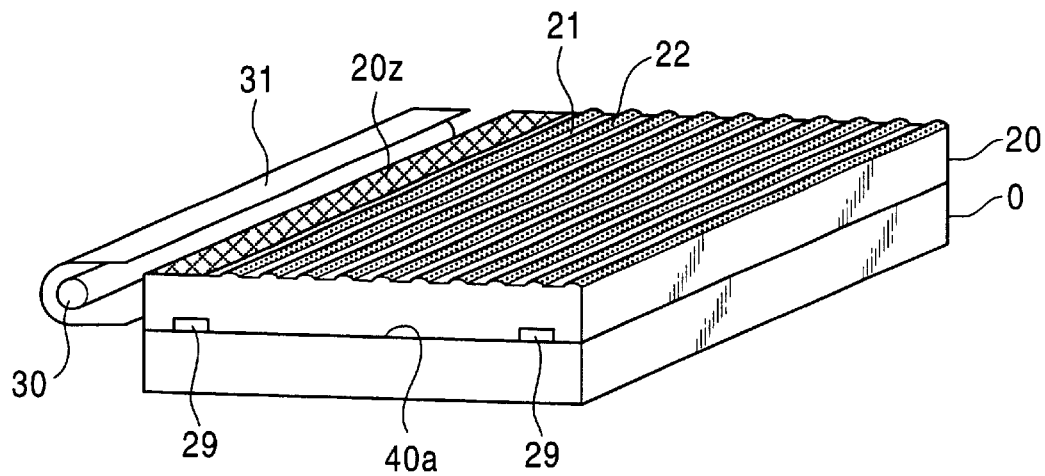
FIG. 11 is a schematic perspective view which shows a reflective display device provided with the light guide plate shown in FIG. 9 and FIG. 10.

FIG. 11 schematically shows a reflective display device fabricated by bonding the light guide plate 20 shown in FIG. 9 and FIG. 10 to a panel 0. An adhesive 40a having a refractive index of 1.50 is used to bond the back surface of the light guide plate 20 to the surface of the panel 0. As described above, two grooves 29 are formed on the back surface of the light guide plate 20, beforehand. A light source 30 is arranged on the end of the light guide plate 20 and the light source 30 is partially covered with a reflecting mirror 31. As the light source 30, a semicylindrical cold cathode fluorescent tube may be used. A step 21 having an inclination of 45 degrees and a planar section 22 are formed on the surface of the light guide plate 20. A diffusing area 20z is also formed on the periphery close to the light source 30. The illumination light radiating from the light source 30 is totally reflected from the step 21 formed on the surface of the light guide plate 20 and guided onto the panel 0 lying below the light guide plate 20. Accordingly, even in a dark environment, the image on the panel 0 can be displayed by the illumination of the light source 30. The diffusing area 20z is formed for diffusing and absorbing the oblique components which have a relatively high incident angle in the illumination light radiating from the light source 30 so that the intensity of the illumination light to the panel 0 is uniformed. This embodiment is characterized by forming a groove 29 on the back surface of the light guide plate 20 for preventing the leakage of the adhesive 40a (a transparent resin having adhesion) by the groove 29 when bonding the back surface of the light guide plate 20 and the surface of the panel 0 to each other.

Figure 12:
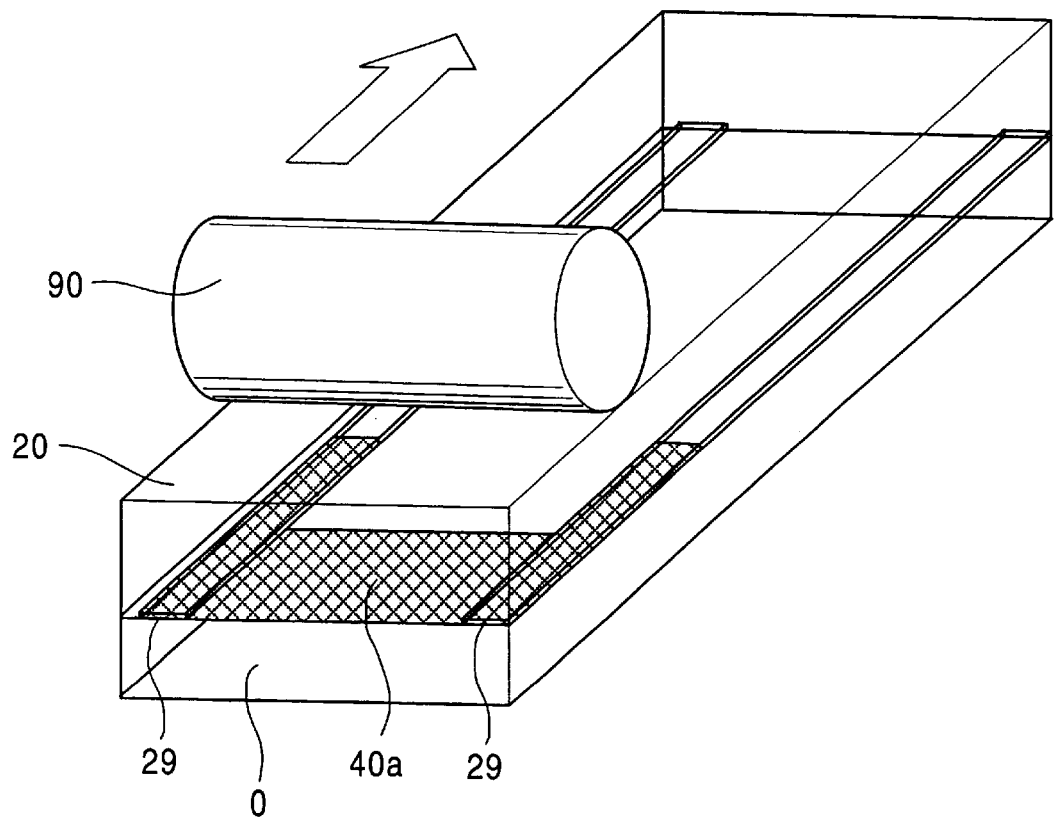
FIG. 12 is a schematic representation which shows a method for fabricating the reflective display device shown in FIG. 11.

FIG. 12 is a schematic representation which shows a method of the fabrication in order to bond the light guide plate 20 and the panel 0 to each other. As described above, two grooves 29 are formed on the back surface of the light guide plate 20, beforehand. Next, an adhesive 40a is applied by printing or the like to at least one of the back surface of the light guide plate 20 and the surface of panel 0. Then, by pressurizing by a pressing roller 90 while the light guide plate 20 and the panel 0 are superposed, the light guide plate 20 and the panel 0 are bonded to each other. A heating treatment is performed to cure the adhesive 40a as required. Thus, by using the light guide plate 20 provided with the groove 29 on the back surface, the leakage of the adhesive 40a can be eliminated when the light guide plate 20 is bonded to the surface of the panel 0, enabling the prevention of the decline of the production yield in the bonding step.

Figure 13:
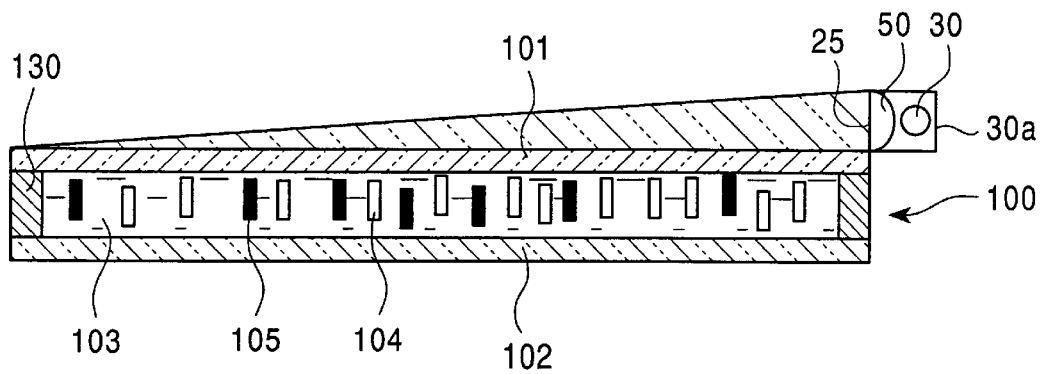
FIG. 13 is a sectional view which shows a reflective display device as a fourth embodiment of the present invention.

FIG. 13 is a schematic sectional view which shows a reflective display device as a fourth embodiment of the present invention. This has the same fundamental structure as the second embodiment of the present invention shown in FIG. 4 and the same reference numerals are assigned to the corresponding parts for facilitating understanding. Notably, the embodiment is provided with a collimating means for collimating the illumination light radiating from the light source 30 and leading it perpendicularly onto the end of the light guide plate 20. In the present embodiment, the collimating means corresponds to a collimator lens 50. The light source 30 is composed of, for example, a semicylindrical fluorescent tube and is arranged facing the end 25 of the light guide plate 20. The collimator lens 50 is also semicylindrical and is arranged between the light source 30 and the light guide plate 20. The collimator lens 50 is stored together with the light source 30 in a cover 30a. As a collimating means, a parabolic reflector arranged at the rear of the light source 30 may be used, instead of the collimator lens 50.

Figure 14:
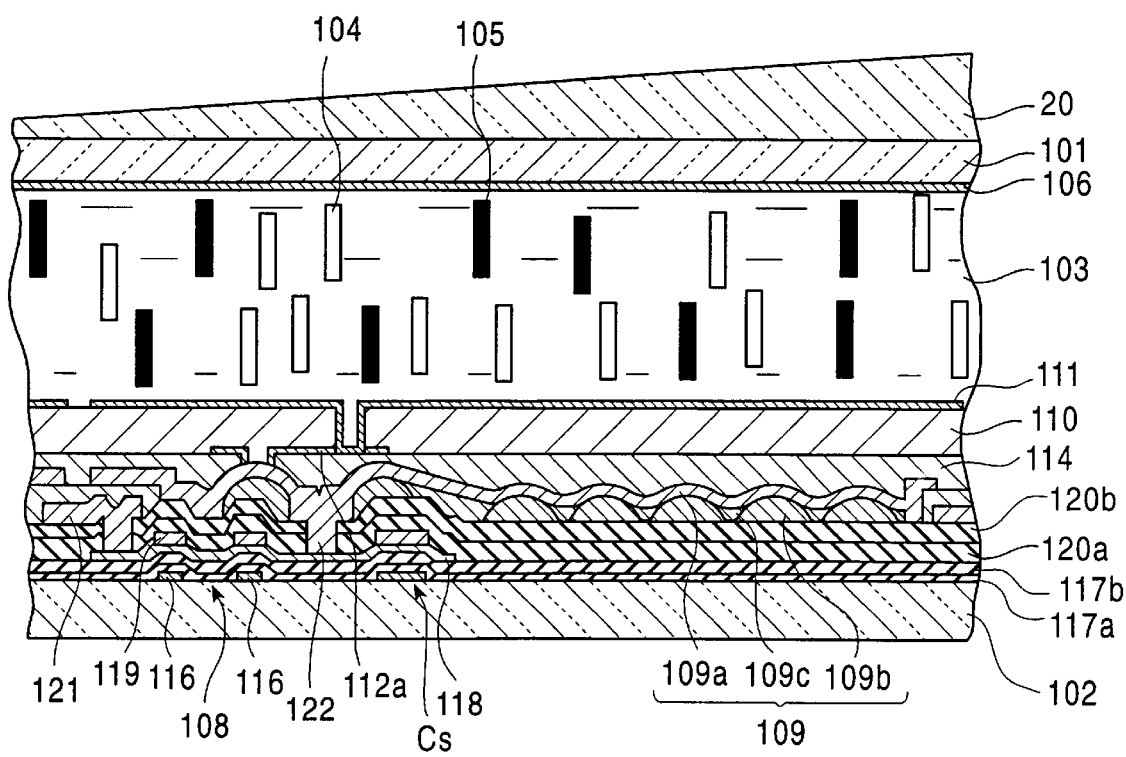
FIG. 14 is an enlarged partial sectional view which shows in detail the reflective display device as the fourth embodiment of the present invention.

FIG. 14 is a partial sectional view which shows an enlarged pixel of the reflective display device shown in FIG. 13. The light guide plate 20 is provided on the outer surface of an upper substrate 101. A guest-host liquid crystal layer composed of a nematic liquid crystal 104 including a dichroic dye 105 is held between the upper substrate 101 and a lower substrate 102. The guest-host liquid crystal layer is driven in response to the electrical field generated between a counter electrode 106 formed on the upper substrate 101 and a pixel electrode 111 formed on the lower substrate 102. On the lower substrate 102, a quarter-wavelength layer 114 for converting polarization and a reflecting layer 109 for scattering are provided. The reflecting layer 109 includes a metal film 109a composed of, for example, aluminum, which is formed on a corrugated resin layer 109b. A resin layer 109c is thinly applied in order to adjust the corrugation of the resin layer 109b. The pixel electrode 111 is electrically connected to the metal film 109a through an intermediate electrode 112a. The metal film 109a is fragmented corresponding to the pixel electrode 111 and is electrically connected to a drain electrode 122 of a thin film transistor 108. The thin film transistor 108 has a double gate structure and is provided with a pair of gate electrodes 116. Also, a supplementary capacitor Cs is connected to the thin film transistor 108. Gate insulating films 117a and 117b lying between the gate electrode 116 and the semiconductor thin film 118 have a two-layer structure. Also, layer insulation films 120a and 120b have a two-layer structure.

Figure 15:
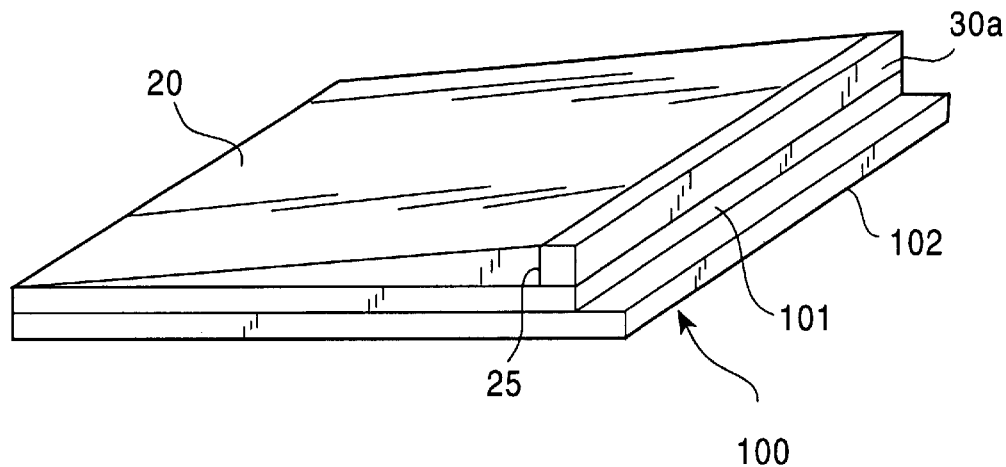
FIG. 15 is a perspective view which shows the entire structure of the fourth embodiment.
Figure 16:
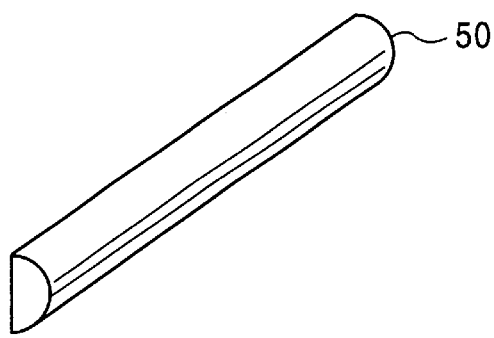
FIG. 16 is a perspective view which shows the shape of a collimator lens used in the fourth embodiment.

FIG. 15 is a schematic perspective view which shows the entire structure of the fourth embodiment. The light guide plate 20 is provided on the panel 100. The cover 30a provided is connected to the end 25 of the light guide plate 20. A light source such as a fluorescent tube and a collimator lens are stored in the cover 30a. As shown in FIG. 16, the collimator lens 50 is semicylindrical, i.e., the shape of a cylinder cut vertically to its ends. The fluorescent tube is arranged facing and parallel to the curved surface of the collimator lens. The flat surface of the collimator lens 50 comes into contact with the end 25 of the light guide plate 20.

Figure 17:
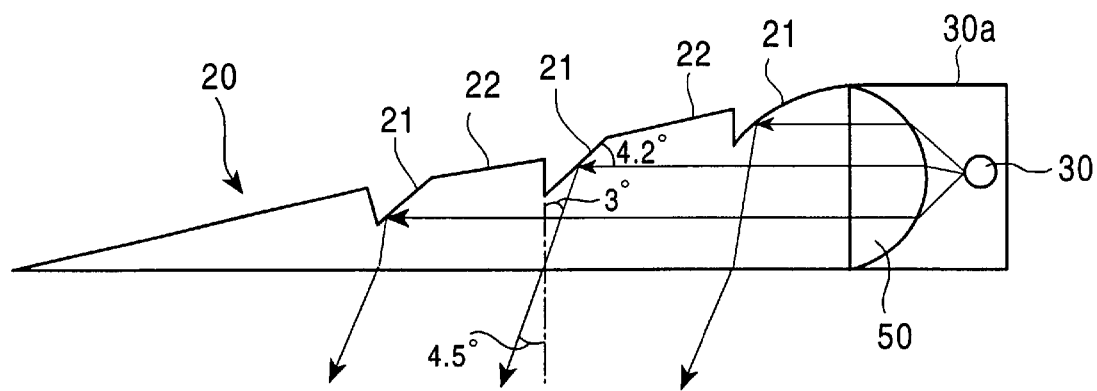
FIG. 17 is a schematic representation which shows the optical properties of the light guide plate incorporated in the fourth embodiment.

FIG. 17 is a schematic representation of the light guide plate 20, showing the optical properties. As shown in the drawing, the light guide plate 20 has a larger thickness at the side which comes into contact with the collimator lens 50 and the thickness decreases toward the front, being a so-called wedge-shape. A minute striped groove is formed on the inclined upper surface of the light guide plate 20 and corresponds to a step 21. The illumination light radiating from the light source 30 is collimated with the collimator lens 50 and is totally reflected from each step 21 so as to efficiently enter into a panel (not shown in the drawing). The light reflected from the panel is emitted toward the side of the viewer mainly through the planar section 22. The angle of inclination of the step 21 is set at 42 degrees. When the light guide plate 20 is composed of glass, the refractive index is 1.5. The collimated illumination light is totally reflected from the step 21 and enters into the panel. When air is intervened at the interface between the light guide plate 20 and the panel, the incident angle of illumination light toward the panel is 4.5 degrees. Or, when the light guide plate 20 is composed of a transparent resin material having a refractive index of 1.4, the angle of total reflection is 45 degrees. If the angle of inclination of the step 21 is equally set at 45 degrees, the illumination light collimated with the collimator lens 50 is totally reflected from the step 21 and enters into the panel substantially perpendicularly. Thus, the dichroic ratio of the guest-host liquid crystal layer can be effectively reflected in the display contrast. The light guide plate having the structure described above can be fabricated inexpensively if it is processed with a resin material by using, for example, a stamper. Also, if the alignment pitch of the step 21 is designed in accordance with the pixel alignment pitch in the side of the panel, the moire appearing between them can be minimized.

Figure 18:
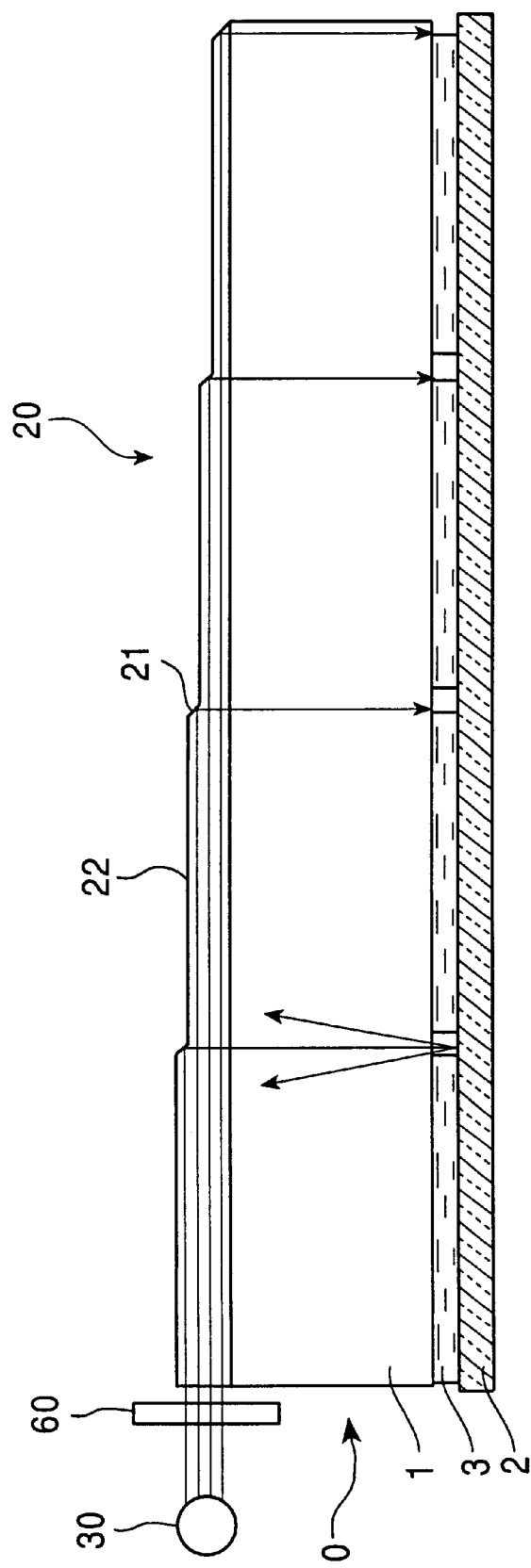
FIG. 18 is a partial sectional view which shows a reflective display device as a fifth embodiment of the present invention.

FIG. 18 is a schematic partial sectional view which shows a reflective display device as a fifth embodiment of the present invention. Basically, this embodiment is the same as the first embodiment shown in FIG. 1, and the same reference numerals are assigned to the corresponding parts for facilitating understanding. Notably, the embodiment includes a polarizing plate 60 provided between the light source 30 and the light guide plate 20 for converting the unpolarized illumination light which is radiating from the light source 30 into linearly polarized light and leading it onto the end 25 of the light guide plate 20. The structure described above enables suppression of the undesirable scattering of illumination light inside the light guide plate 20, resulting in the improvement of the display contrast. Preferably, the polarizing plate 60 converts illumination light into linearly polarized light which is parallel to or perpendicular to the light guide plate. On the other hand, the electro-optical material held in a panel 0 comprises a guest-host liquid crystal layer 3 including a liquid crystal. The liquid crystal is controlled in the alignment direction parallel to or orthogonally to the polarization direction of the illumination light converted into linearly polarized light, which can enhance the dichroic ratio of the guest-host liquid crystal layer 3, resulting in the improvement of the display contrast. When the step 21 is formed on the light guide plate 20 by cutting operations or the like, a residual distortion generally occurs inside the light guide plate 20. Thereby, uniaxial anisotropy occurs inside the light guide plate 20, creating an area which causes double refraction. If illumination light enters into the double-refraction area, it is scattered. Since the scattered light is not related with the optical switching of the panel 0, it lowers the display contrast of the panel 0. Therefore, the polarizing plate 60 is provided between the light source 30 and the light guide plate 20 in order to improve the contrast. In view of the residual distortion of the light guide plate 20, the scattered light reaches minimum when the linear polarization direction of illumination light is parallel to or perpendicular to the light guide plate 20. Also, by controlling the alignment direction of the liquid crystal parallel to or orthogonally to the linearly polarized light, the switching effect of the liquid crystal can be maximized, and thus the display contrast can be improved.

FIG. 19 shows a reflective display device as a sixth embodiment of the present invention. FIG. 19A shows the shape of the light guide plate which is the most important part of the embodiment, and FIG. 19B shows the shape of another light guide plate in comparison with the embodiment. As shown in FIG. 19A, the step 21 in accordance with the embodiment includes a curved inclined area and reflects illumination light diffusively so as to lead it onto the first substrate of the panel (not shown in the drawing). In the example shown in the drawing, each step 21 has a convex face and the angle of inclination ranges from 40 to 50 degrees. The height of the step is 6 $\mu$m and the alignment pitch between the steps 21 is 118 $\mu$m. However, these dimensions are just one example. In the present embodiment, the step 21 has a curvature and the angle of incidence of illumination light toward the panel is changed continuously in the range of ±5 degrees. That is, the angle between the tangent line of the convex face and the surface of the planar section 22 ranges from 40 to 50 degrees. Thus, the scattered illumination light enters into the panel and the frontal reflection is suppressed. Therefore, the glare observed when the image is viewed from the front can be controlled.

In the example to be compared, shown in FIG. 19B, the step has a flat surface having an inclination of 45 degrees. The illumination light radiating from the light source advances inside the light guide plate 20 parallel to the bottom face and is totally reflected at the step 21 having an inclination of 45 degrees so as to perpendicularly enter into the panel which is arranged directly below. In such a case, if the image is viewed from the front of the panel, the parallel illumination light perpendicularly entering and the light reflected from the panel interfere with each other, resulting in glare in the display.

Figure 20:
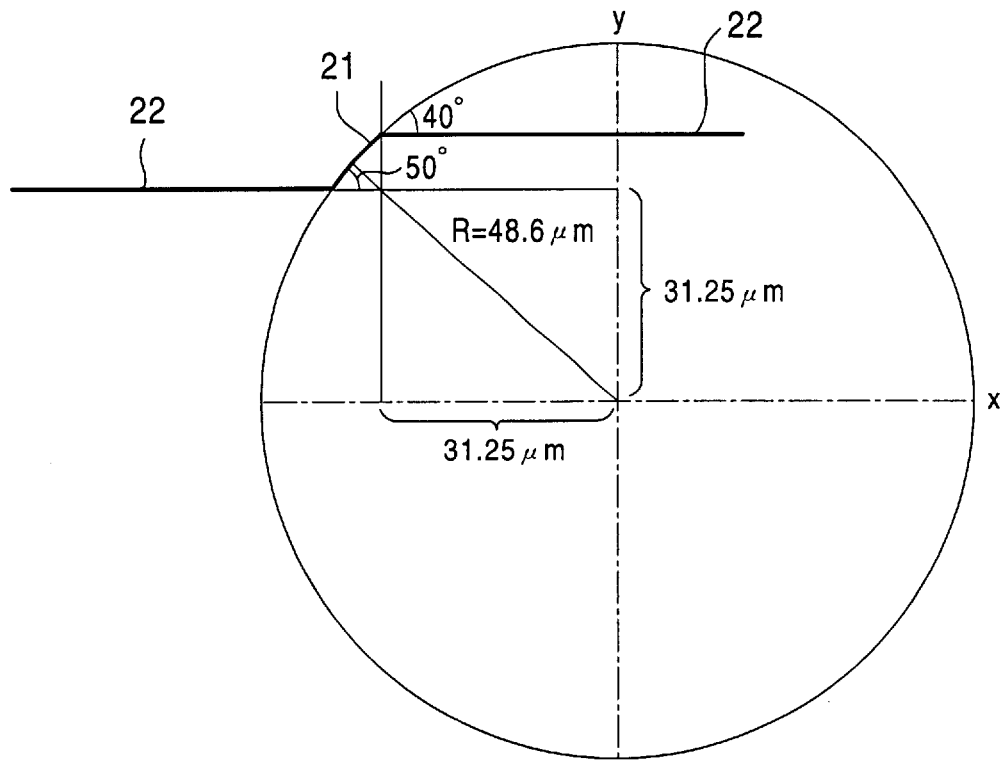
FIG. 20 is a geometric representation for explaining the sixth embodiment.

FIG. 20 is a schematic view of a cutout of the curved step 21. The curved surface of the step 21 lies on a circle with radius R=48.6 $\mu$m. By cutting out a circular arc at 31.25 $\mu$m from the origin both in the X and Y axes, a curved surface having an angle of inclination varying in the range from 40 to 50 degrees is obtained. In order to form the step having a circular arc like this, for example, a wedged surface of the light guide plate may be cut into a stripe with a diamond cutter. Or, after cutting a master disc with a diamond cutter, it may be used as a stamper to mass-produce the light guide plate.

Figure 21:
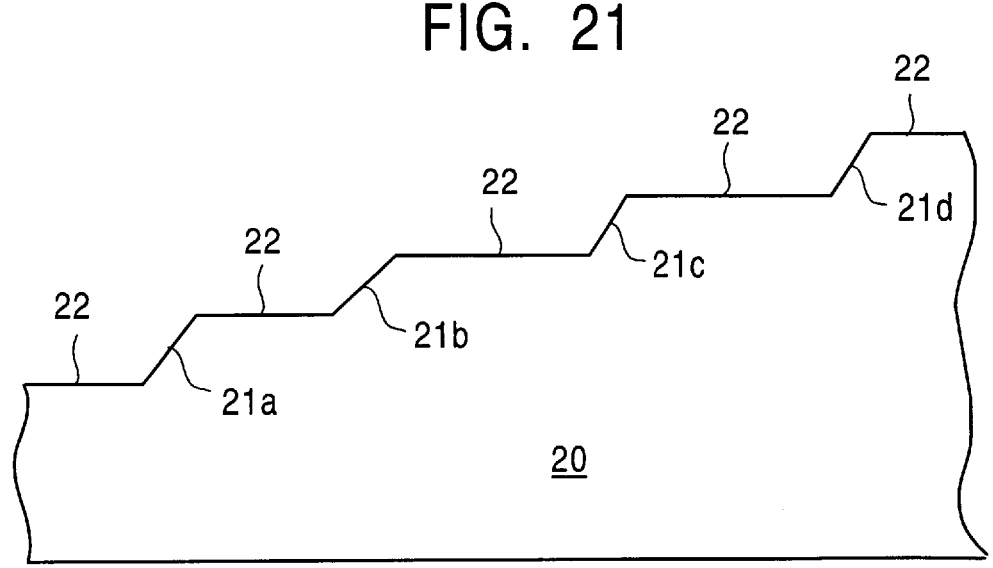
FIG. 21 is a partial sectional view showing a variation to the sixth embodiment.

FIG. 21 shows a variation to the sixth embodiment. In this example, steps 21a, 21b, 21c and 21d are formed with different angles of inclination and reflect illumination light according to the angles of inclination and lead it onto the side of the panel with different angles. In such a structure, the same effect as the sixth embodiment can be obtained.

Figure 22:
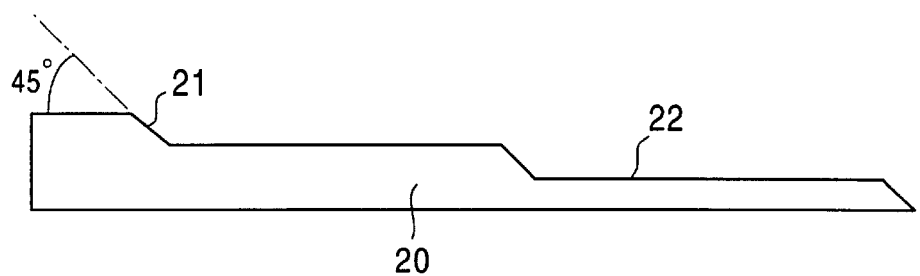
FIG. 22 is a schematic diagram showing a typical structure of the light guide plate used in the reflective display device in accordance with the present invention.

As described above, the reflective display device does not consume much electric power and is expected to be used as a display for information terminals. However, differing from a transmissive display device which is provided with a backlight, a reflective display device does not allow an image to be viewed in a dark environment. In order to solve this problem, in the present invention, a light guide plate is used. FIG. 22 shows a typical structure of the light guide plate in accordance with the present invention. As has been frequently explained, the light guide plate 20 is arranged on the surface of the glass substrate in the front side of the reflective panel. The light guide plate 20 includes, for example, the step 21 having an area with an inclination angle of 45 degrees and the planar section 22 which is parallel to the glass substrate of the panel, and corresponds to a prism sheet having a periodical structure.

Figure 23:
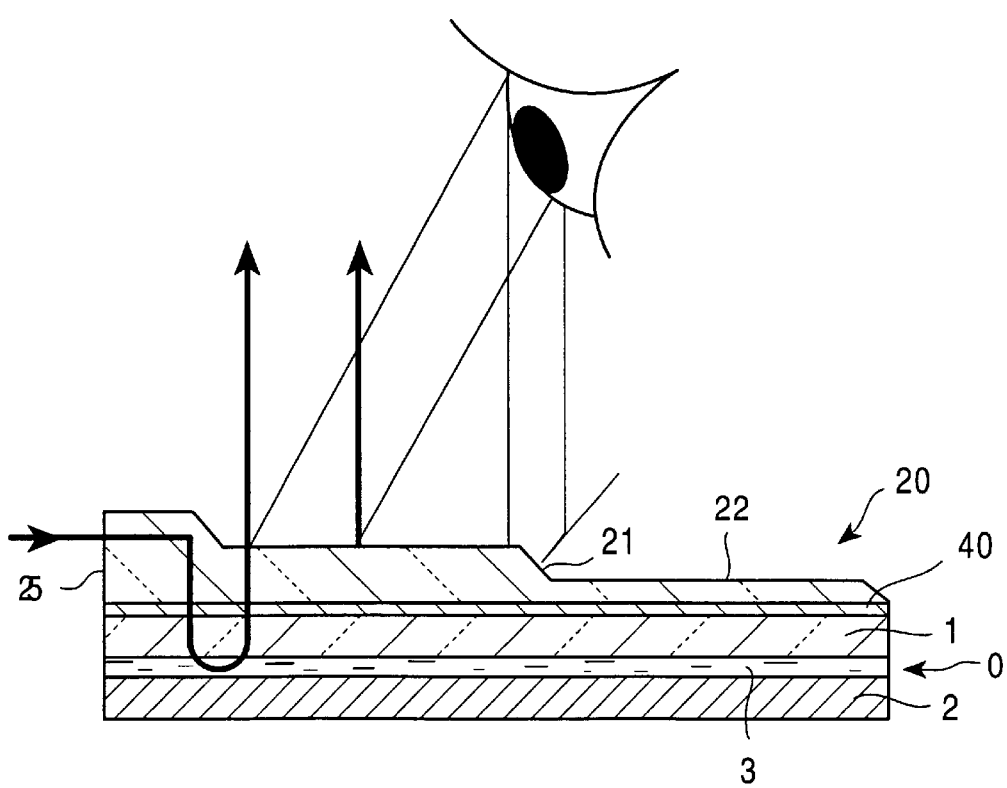
FIG. 23 is a schematic diagram showing the usage and the properties of the light guide plate shown in FIG. 22.

FIG. 23 is a schematic diagram showing the usage of the prism sheet shown in FIG. 22. A light source composed of, for example, a cold cathode fluorescent tube is arranged near the end 25 of the light guide plate 20. The illumination light radiating from the cold cathode fluorescent tube horizontally enters through the end 25 and is almost totally reflected perpendicularly downward at the step 21 having an inclination of 45 degrees. The reflected light can illuminate the reflective panel 0 from the front side. In a bright environment, the screen is viewed by using external light, while in a dark environment, the screen can be viewed by illuminating the panel 0 with the cold cathode fluorescent tube turned on. By using the cold cathode fluorescent tube and the light guide plate in this way, the reflective display device which is usable in any environment while maintaining a low consumption of electric power can be obtained. However, when the light guide plate 20 shown in FIG. 18 is provided on the front surface of the reflective panel 0, interference fringes may occur owing to the periodical structure of the light guide plate (prism sheet) depending on the circumstance, making it difficult to view the screen. When the illumination light radiating from the light source is reflected perpendicularly downward, it is diffracted owing to the periodical structure of the light guide plate 20, generating first-order light, second-order light, and so on, in addition to zero-order light. The illumination light reflected from the second substrate 2 passes through the light guide plate 20 again, however, it is diffracted again and the zero-order light and the first-order light, etc. are generated. The zero-order light and the first-order light caused by diffraction which has occurred twice interfere with each other and bright and dark fringes overlapping on the screen may be viewed. This may slightly spoil the good view of the display. In particular, when the screen is viewed from the front side of the panel 0 obliquely opposite to the light source, the interference fringes become distinct. That is, if the eyes of the viewer slant toward the opposite side to the inclined area of the step 21, the interference fringes become distinct. As the slant of the eyes of the viewer becomes larger, the interference fringes become more distinct.

Figure 24:
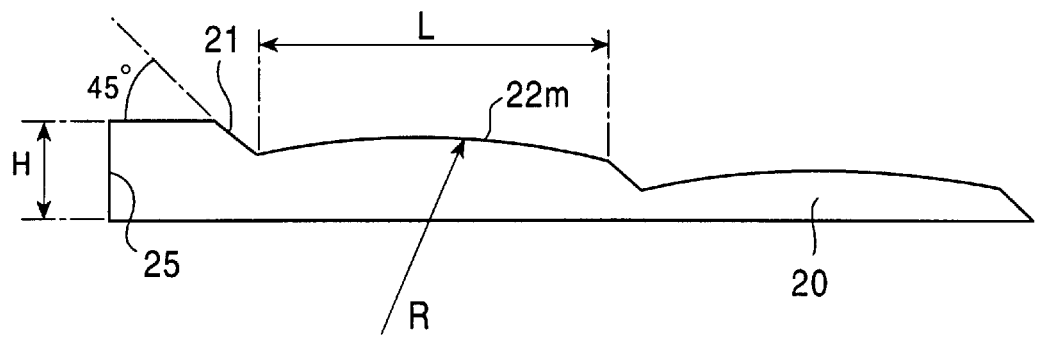
FIG. 24 is a sectional view showing a light guide plate as the important part of a reflective display device as a seventh embodiment of the present invention.

FIG. 24 shows a seventh embodiment of the present invention, presenting the structure of the light guide plate for improving the defect described above. As shown in the drawing, the light guide plate 20 includes a trapezoidal section 22m divided into bands and an inclined step 21 lying between each band of the trapezoidal section. The trapezoidal section 22m shown in FIG. 24 corresponds to the planar section 22 shown in FIG. 22. In the present embodiment, each trapezoidal section includes a curved lens area instead of a flat area. The light guide plate 20 reflects the illumination light radiating from the light source at each step 21 so as to guide it onto the first substrate and also emits the illumination light reflected from the second substrate through the lens area of each trapezoidal section 22m. The surface of the light guide plate 20 is, for example, 90 mm×120 mm in size. The end 25 of the light guide plate 20 facing the light source has a thickness of, for example, H=3.2 mm. The thickness decreases stepwise moving away from the light source and the tip has a thickness of, for example, 0.2 mm. The light guide plate 20 is obtained by processing, for example, a transparent acrylic plate. The step 21 can be formed by mechanically processing the acrylic plate with a diamond cutter having an inclination of 135 degrees. The light guide plate processed like this includes a base of the acrylic plate, the step 21 having an inclination of 45 degrees, and the trapezoidal section 22m lying between each step. The arrangement distance L between the adjacent steps 21 is, for example, 120 $\mu$m. Notably, when the trapezoidal section 22m is processed, the acrylic plate is cut with a diamond cutter being concaved to a radius R=1 mm. By using such a cutter, the surface of the trapezoidal section 22m is processed into a curved lens area. In the end, the surface structure of the light guide plate 20 includes a microprism corresponding to each step 21 and a microlens corresponding to each trapezoidal section 22m. By using a light guide plate having such a structure, it is possible to perform the front illumination without causing interference fringes to the reflective panel.

Figure 25:
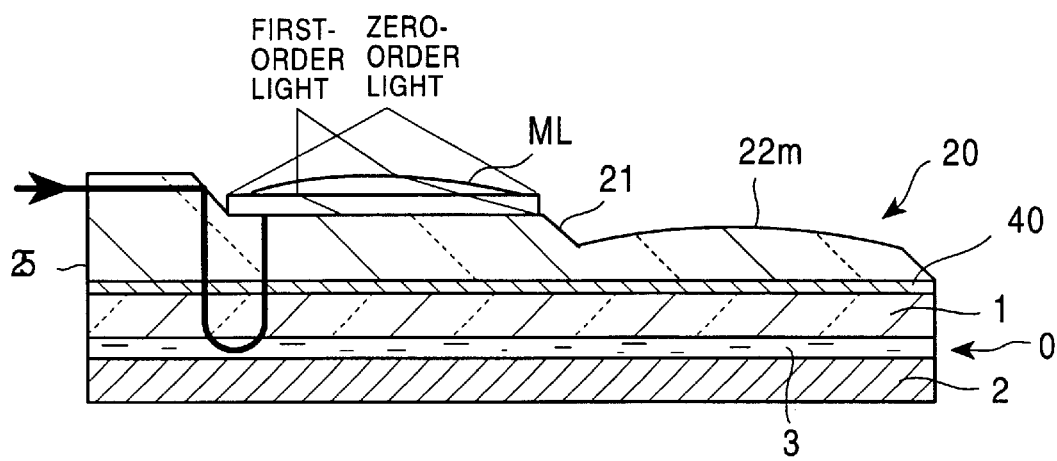
FIG. 25 is a schematic diagram showing the usage and properties of the light guide plate shown in FIG. 24.

FIG. 25 is a schematic diagram showing the usage and the properties of the light guide plate shown in FIG. 24. The light guide plate 20 is fixed on the front surface of the reflective panel 0 through the intervening layer 40 composed of a transparent adhesive or the like. As described above, in the light guide plate 20, the step 21 having an inclination of 45 degrees is arranged with a distance of, for example, 120 $\mu$m. The trapezoidal section 22m is provided between the adjacent steps 21. In the drawing, for facilitating understanding, the properties of the trapezoidal section 22m are schematically shown using a microlens ML. A light source (not shown in the drawing) composed of a cold cathode fluorescent tube or the like is provided adjacently to the end 25 of the light guide plate 20. The illumination light radiating from the cold cathode fluorescent tube is reflected perpendicularly downward at each step 21 and illuminates the panel 0. The illumination light is reflected from the second substrate 2 and passes through the light guide plate 20 to reach the viewer. As described above, in a dark environment, the panel 0 is viewed by making use of the illumination light of the cold cathode fluorescent tube. Further, the adhesive used for the intervening layer 40 may be selected from, for example, a transparent resin material having a refractive index of 1.50 in order to improve the optical coupling of the light guide plate 20 and the panel 0. Also, a deflector may be used in order to improve the illumination efficiency of the cold cathode fluorescent tube.

Notably, the microlens ML condenses the parallel diffracted light, such as the zero-order light and the first-order light emitting from the trapezoidal section 22m periodically arranged into the focus of the microlens ML. Accordingly, the viewer who may be present at substantially an infinite position is not directly affected by the diffracted light. By using the light guide plate provided with the microlens, the influence of the interference fringes can be eliminated. In the structure of the light guide plate shown in FIG. 18, the planar section 22 does not include a collimating means, therefore, the parallel diffracted light emitting from the panel interferes at the infinite point, resulting in bright and dark fringes. By contrast, in the light guide plate shown in FIG. 20 and FIG. 21, because of the properties of the microlens ML, bright and dark fringes are formed at a short distance right above the panel 0 by several millimeters. Accordingly, the bright and dark fringes are not at all observed by the viewer who is present at an appropriate distance and a good quality display is obtained. As described above, in accordance with the present embodiment, the light guide plate 20 provided with the microlens in addition to the microprism can cancel the interference fringes caused by the periodical prism structure, and a good quality display is obtained even in the case of the front illumination.

Figure 26:
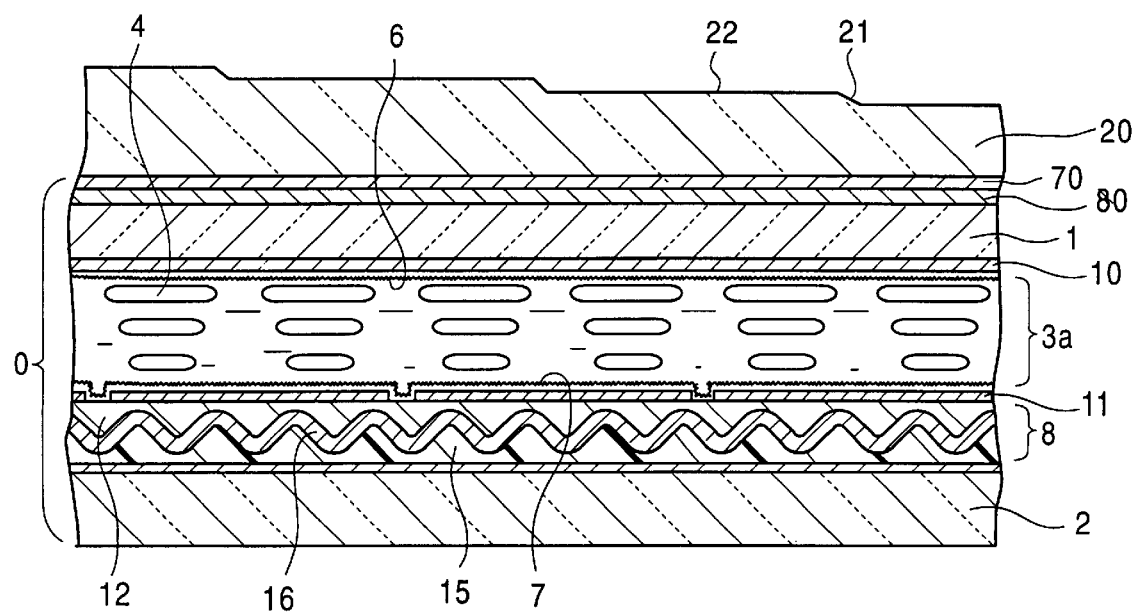
FIG. 26 is a schematic partial sectional view which shows a reflective display device as an eighth embodiment of the present invention.

FIG. 26 is a schematic partial sectional view which shows a reflective display device as an eighth embodiment of the present invention. The same reference numerals are assigned to the parts corresponding to those of the first embodiment shown in FIG. 1 for facilitating understanding. In this embodiment a Twist Nematic-Electrically Controlled Birefringence (TN-ECB) mode liquid crystal panel is used as the panel 0, while in the first embodiment a guest-host mode liquid crystal panel is used. As shown in the drawing, the reflective display device includes a light guide plate 20 and a panel 0. A step 21 and a planar section 22 are formed on the surface of the light guide plate 20. The back surface of the light guide plate 20 is deposited on the surface of the panel 0. A polarizing plate 70 and a quarter-wavelength plate 80 are provided on the surface of the panel 0. The panel 0 includes a first substrate 1 composed of transparent glass or the like lying on the side of external incident light joined to a second substrate 2 lying on the reflection side with a predetermined gap therebetween. A nematic liquid crystal layer 3a is held in the gap between both the substrates 1 and 2. The liquid crystal molecules 4 are twistedly aligned by the upper and lower alignment layers 6 and 7. Electrodes 10 and 11 are provided on the inner surfaces of the substrates 1 and 2, respectively, for applying a voltage to the nematic liquid crystal layer 3a of each pixel. In this embodiment, the electrode 10 provided on the side of the first substrate 1 is patterned into a stripe, and the electrode 11 provided on the side of the second substrate 2 is also formed into a stripe. Both electrodes 10 and 11 are arranged orthogonally to each other and pixels are delimited by the crossing parts, which is a so-called "passive matrix" type. The polarizing plate 70 and the quarter-wavelength plate 80 are arranged on the side of the first substrate 1 of the panel 0. The reflective liquid crystal display device having such a structure is a TN-ECB type and has a so-called "normally white" mode. That is, in the absence of an applied voltage, the nematic liquid crystal layer 3a functions as a quarter-wavelength plate by maintaining a twisted alignment and performs a white display by transmitting external light in cooperation with the polarizing plate 70 and the quarter-wavelength plate 80. In the presence of an applied voltage, the nematic liquid crystal layer 3a does not function as a quarter-wavelength plate by shifting to a vertical alignment and performs a black display by intercepting external light in cooperation with the polarizing plate 70 and the quarter-wavelength plate 80.

In reference to FIG. 26, each component will be described in detail. As mentioned above, the polarizing plate 70 is provided on the surface of the first substrate 1 of the panel 0. The quarter-wavelength plate 80 is provided between the polarizing plate 70 and the first substrate 1. The quarter-wavelength plate 80 is composed of, for example, a uniaxially stretched polymeric film, and a phase difference by a quarter-wavelength arises between an ordinary ray and an abnormal ray. The optical axis (uniaxial anisotropic axis) of the quarter-wavelength plate 80 is arranged at an angle of 45 degrees toward the polarization axis (transmission axis) of the polarizing plate 70. The external light is converted into a linearly polarized light by passing through the polarizing plate 70. The linearly polarized light is converted into a circularly polarized light by passing through the quarter-wavelength plate 80. It is again converted into a linearly polarized light by passing through the quarter-wavelength plate. In such a case, the polarization direction rotates by 90 degrees from the original polarization direction. As described above, the quarter-wavelength plate in combination with the polarizing plate can rotate the polarization direction, which is used for displaying.

The panel 0 uses the nematic liquid crystal layer 3a, as the electro-optical material, which is basically horizontally aligned and has a positive dielectric anisotropy. The nematic liquid crystal layer 3a functions as a quarter-wavelength plate by appropriately setting its thickness. In this embodiment, the refractive index anisotropy $\Delta n$ of the nematic liquid crystal layer 3a is approximately 0.7 and the thickness of the nematic liquid crystal layer 3a is approximately 3 $\mu$m. Therefore, the retardation $\Delta n \cdot d$ of the nematic liquid crystal layer 3a is from 0.2 to 0.25 $\mu$m. By twistedly aligning the nematic liquid crystal molecules 4 as shown in the drawing, the above-mentioned retardation value will reach approximately 0.15 $\mu$m (150 nm). The value is approximately one fourth of the central wavelength of the external light (approximately 600 nm), thus enabling the nematic liquid crystal layer 3a to optically function as a quarter-wavelength plate. A predetermined twisted alignment can be obtained by sandwiching the nematic liquid crystal layer 3a between the upper and lower alignment layers 6 and 7. The liquid crystal molecules 4 align along the rubbing direction of the alignment layer 6 on the side of the first substrate 1 and the liquid crystal molecules 4 align along the rubbing direction of the alignment layer 7 on the side of the second substrate 2. By shifting the rubbing direction of the alignment layer 6 from that of the alignment layer 7 by 60 to 70 degrees, a predetermined twisted alignment can be obtained.

A reflecting layer 8 is formed below the electrode 11 on the side of the second substrate 2. The reflecting layer 8 has a corrugated surface and scatters light. Accordingly, its paper-white appearance is suitable for the display background and since it reflects the incident light with a relatively wide angle range, the viewing angle range is enlarged, and thus the display is easily viewed as well as the brightness of the display being increased. A transparent flattening layer 12 is provided between the reflecting layer 8 and the electrode 11 for compensating the corrugation. The reflecting layer 8 includes a resin layer 15 having a corrugation and a metal film 16 formed on the surface thereof, composed of, for example, aluminum. The resin layer 15 is a photosensitive resin layer whose corrugation is patterned by means of photolithography. The photosensitive resin layer 15 is composed of, for example, a photo resist and applied to the entire surface of the substrate. It is exposed to light through a given mask and, for example, is formed into a cylindrical pattern. Next, by heating to melt, the corrugation is formed stably. On the surface of the corrugation formed as described above, a metal film 16, composed of aluminum or the like having a predetermined thickness and a good reflectance, is provided. If the depth of the corrugation is set at several $\mu$m, a good light scattering property is obtained and the reflecting layer 8 will have a white color. On the surface of the reflecting layer 8, the flattening layer 12 is provided to compensate the corrugation. It is preferable that the flattening layer 12 is composed of a transparent organic substance, for example, an acrylic resin or the like. By intervening the flattening layer 12, the electrode 11 and the alignment layer 7 are formed stably.

Figure 27:
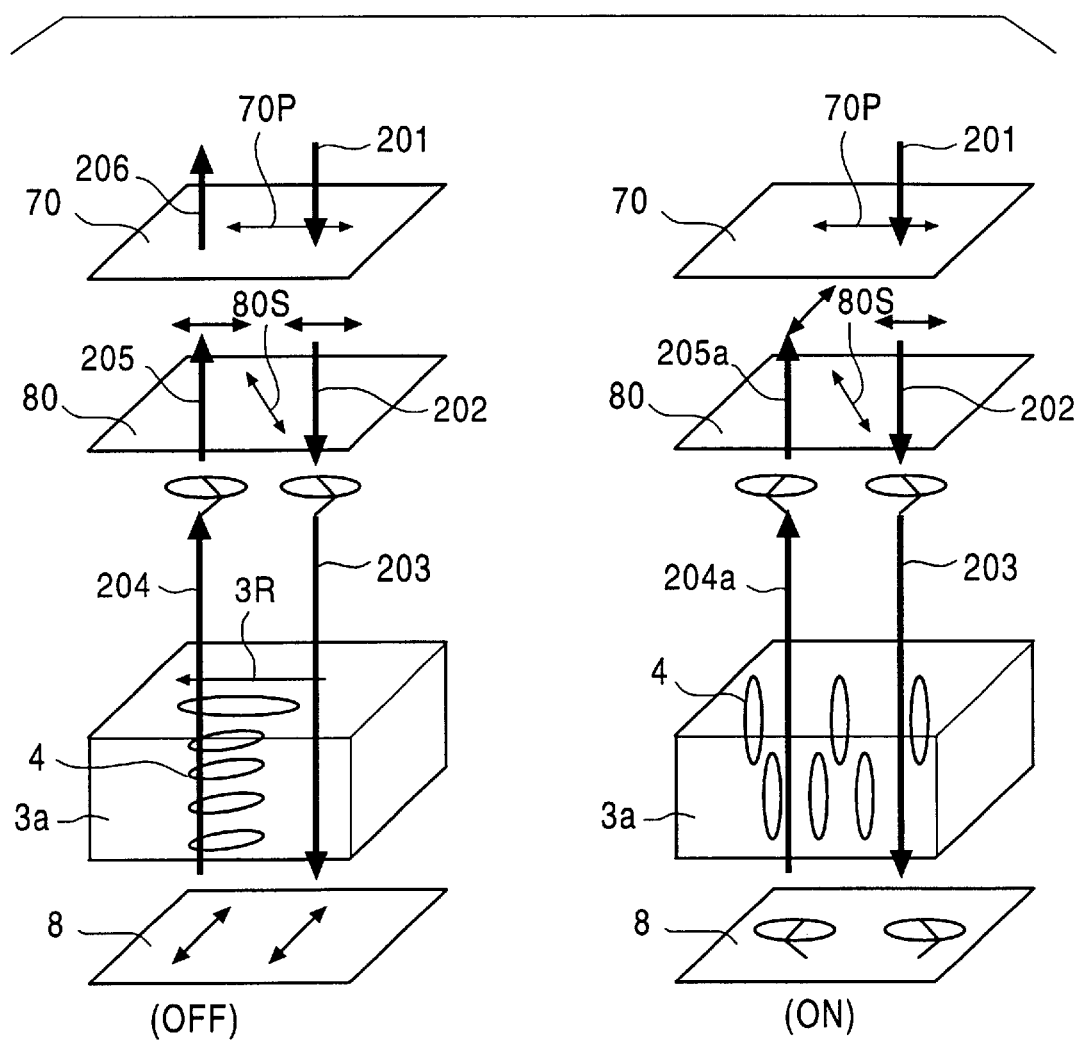
FIG. 27 is a schematic diagram which explains the function of the reflective display device as the eighth embodiment.

With reference to FIG. 27, the performance of the reflective display device shown in FIG. 26 will be described in detail. In the drawing, (OFF) shows the state in the absence of an applied voltage and (ON) shows the state in the presence of an applied voltage. As shown in (OFF), the reflective display device includes the polarizing plate 70, the quarter-wavelength plate 80, the nematic liquid crystal layer 3a and the reflecting layer 8 deposited in that order from the side of the viewer. The polarization axis (transmission axis) of the polarizing plate 70 is shown by 70P. The optical axis 80S of the quarter-wavelength plate 80 and the transmission axis 70P form an angle of 45 degrees. Also, the alignment direction 3R of the liquid crystal molecules 4 on the side of the first substrate is parallel to the polarization axis (transmission axis) 70P of the polarizing plate 70.

The incident light 201 is converted into a linearly polarized light 202 by passing through the polarizing plate 70. Its polarization direction is parallel to the transmission axis 70P, and hereinafter it is referred to as a "parallel linearly polarized light". The parallel linearly polarized light 202 is converted into a circularly polarized light 203 by passing through the quarter-wavelength plate 80. The circularly polarized light 203 is converted into a linearly polarized light by passing through the nematic liquid crystal layer 3a which functions as a quarter-wavelength plate. However, the polarization direction of the linearly polarized light is rotated by 90 degrees and is orthogonal to the parallel linearly polarized light 202. Hereinafter, it is referred to as an "orthogonal linearly polarized light". The orthogonal linearly polarized light 203 is converted into a circularly polarized light 204 because it again passes through the nematic liquid crystal layer 3a which functions as a quarter-wavelength plate after being reflected from the reflecting layer 8. The circularly polarized light 204 is converted into a parallel linearly polarized light 205 the same as before because it yet again passes through the quarter-wavelength plate 80. The parallel linearly polarized light 205 eventually becomes an emitting light 206 after passing through the polarizing plate 70 to reach the viewer, and thus a white display is obtained.

In the state shown in (ON), in the presence of an applied voltage, the liquid crystal molecules 4 have a vertical alignment instead of a twisted alignment and do not function as a quarter-wavelength plate. The external light 201 passing through the polarizing plate 70 is converted into a parallel linearly polarized light 202. The parallel linearly polarized light 202 is converted into a circularly polarized light 203 by passing through the quarter-wavelength layer 80. The circularly polarized light 203 passes through the nematic liquid crystal layer 3a as a circularly polarized light, is reflected by the reflecting layer 8, and reaches the quarter-wavelength layer 80 as a circularly polarized light 204a. The quarter-wavelength layer 80 converts the circularly polarized light 204a into an orthogonal linearly polarized light 205a. Since the orthogonal linearly polarized light 205a cannot pass through the polarizing plate 70, a black display is obtained.

As described above, in accordance with the present invention, a light guide plate is arranged on a reflective panel, and a light source for performing an auxiliary illumination is arranged on the end of the light guide plate. The light guide plate normally transmits external light onto the panel and emits the external light reflected from the panel, and also, as required, guides illumination light onto the panel and emits the illumination light reflected from the panel. In a dark environment, although the panel is a reflective type, the image can be viewed by turning the light source on. On the other hand, in a bright environment which has an abundant amount of external light, electric power can be saved by turning the light source off. Also, in accordance with the present invention, the light guide plate and the panel are joined to each other with a transparent intervening layer therebetween in order to suppress undesirable reflection of illumination light and external light at the interface between the light guide plate and the panel by appropriately setting a refractive index of the intervening layer. Since matching of the refractive index between the light guide plate and the panel is obtained, in an environment which has an abundant amount of external light, for example, in the daytime, external light is efficiently led into the panel, and also when illumination light is required, for example, at night, the undesirable reflection can be almost completely suppressed. By joining the light guide plate and the panel with an adhesive, they can be integrated. In particular, by providing a groove on the back surface of the light guide plate, the adhesive resin can be prevented from leaking out when the back surface of the light guide plate and the surface of the panel are joined to each other. Also, in accordance with the present invention, a collimating means like a collimator lens is employed in order to collimate the illumination light radiating from the light source and lead it perpendicularly onto the end of the light guide plate, and thus the utilization efficiency of the illumination light can be greatly improved. Also, in accordance with the present invention, by providing a polarizing plate between the light source and the light guide plate, the undesirable scattering of the illumination light inside the light guide plate can be suppressed, and thus the display contrast can be improved. In addition, by leading linearly polarized light into the panel, the optical switching properties of the panel become more efficient, resulting in the improvement of the display contrast. Also, in accordance with the present invention, the step of the light guide plate includes a curved inclined area for reflecting illumination light diffusively and leading it into the side of the panel. Thus, the intensity of the frontal reflected light can be lowered and the glare of the display screen can be controlled. Also, in accordance with the present invention, the light guide plate includes a trapezoidal section divided into bands and an inclined step lying between each trapezoidal section, and also each trapezoidal section includes a curved lens area. Thus, the interference fringes caused by the periodical structure of the light guide plate can be controlled, and the quality of the display screen can be improved.

What is claimed is:

1. A front lit reflective display device, comprising:

a panel comprising a transparent first substrate lying on a side of external incident light, a second substrate joined to said first substrate with a predetermined gap therebetween and lying on a reflection side, an electro-optical material held in said gap, and an electrode provided on at least one of said first substrate and said second substrate for applying a voltage to said electro-optical material and a reflecting layer provided on said second substrate;

a transparent light guide plate arranged on an outside of said first substrate, said light guide plate normally transmitting external light onto said first substrate and emitting the external light reflected from said second substrate, while, as required, guiding illuminating light onto said first substrate and emitting the illumination light reflected from said second substrate; and a light source arranged on an end of said light guide plate, and wherein a polarizing plate is provided between the light source and said light guide plate for converting the unpolarized illumination light radiating from said light source into linearly polarized light, and leading it onto said light guide plate, and suppressing undesired scattering of the illumination light inside said light guide plate, wherein said light guide plate and said panel are joined to each other with a transparent intervening layer therebetween, said intervening layer comprising a transparent resin having an adhesion and a refractive index being approximately set so as to suppress undesirable reflection of the illumination light and the external light at the interface between said light guide plate and said panel, wherein said light guide plate is provided with a groove on the back surface thereof for preventing said resin of said intervening layer from leaking out to a side or outer surface of said light guide plate and provides a uniform coverage of resin within an interface between the light guide plate and the panel, when the back surface of said light guide plate and the surface of said panel are joined to each other, and wherein said electro-optical material comprises a liquid crystal which can be controlled in an alignment direction parallel to or orthogonally to a polarization direction of said illumination light converted into linearly polarized light.

2. A reflective display device according to claim 1, wherein said reflective display device further comprises a collimating means for collimating the illumination light radiating from said light source and leading it perpendicularly onto the end of said light guide plate.

3. A reflective display device according to claim 2, wherein said light source is semicylindrically formed and arranged facing the end of said light guide plate and said collimating means corresponds to a semicylindrical collimator lens arranged between said light source and said light guide plate.

4. A reflective display device according to claim 1, wherein said polarizing plate converts illumination light into linearly polarized light which is parallel to or perpendicular to said light guide plate.

5. A reflective display device according to claim 1, wherein said light guide p late comprises a trapezoidal section divided into ban ds and an inclined step lying between each band of said trapezoidal section, each band of said trapezoidal section comprising a curved lens area, and said light guide plate reflects the illumination light radiating from said light source at each step so as to guide it onto said first substrate and emits the illumination light reflected from said second substrate through said lens area of each band of said trapezoidal section.

6. A reflective display device according to claim 1, wherein said panel comprises a guest-host liquid crystal layer as said electro-optical material, comprising a liquid crystal as a host to which a dichroic dye is added as a guest.

7. A reflective display device according to claim 6, wherein said panel comprises a reflecting layer lying on the side of said second substrate for scattering and reflecting external light, and a quarter-wavelength layer provided between said guest-host liquid crystal layer and said reflecting layer.

8. A reflective display device according to claim 1, wherein said panel comprises a polarizing plate provided on the side of said first substrate and a liquid crystal layer as said electro-optical material, said liquid crystal layer functioning as a quarter-wavelength plate in response to the state of an applied voltage.

9. A reflective display device according to claim 1, wherein a quarter-wavelength plate is provided between said polarizing plate and said liquid crystal layer, and said liquid crystal layer comprises a nematic liquid crystal layer having a positive dielectric anisotropy and a twisted alignment, said quarter wavelength plate functions as a quarter-wavelength plate in the absence of an applied voltage, and does not function as a quarter-wavelength plate in the presence of an applied voltage.

10. A front lit reflective display device, comprising:

a panel comprising a transparent first substrate lying on a side of external incident light, a second substrate joined to said first substrate with a predetermined gap therebetween and lying on a reflection side, an electro-optical material held in said gap, and an electrode provided on at least one of said first substrate and said second substrate for applying a voltage to said electro-optical material and a reflective layer provided on said second substrate;

a transparent light guide plate arranged on an outside of said first substrate, said light guide plate normally transmitting external light onto said first substrate and emitting the external light reflected from said second substrate, while, as required, guiding illumination light onto said first substrate and emitting the illumination light reflected from said second substrate; and a light source arranged on an end of said light guide plate, wherein said light guide plate comprises a plurality of planar sections divided into bands and an inclined step lying between each band of substantially parallel planar sections and said light guide plate reflects the illumination light guided forward at each step so as to guide it onto said first substrate and also emits the illumination light reflected from said second substrate through said planar sections, wherein said light guide plate and said panel are joined to each other with a transparent intervening layer therebetween, said intervening layer comprising a transparent resin having an adhesion and a refractive index being approximately set so as to suppress undesirable reflection of the illumination light and the external light at the interface between said light guide plate and said panel, wherein said light guide plate is provided with a groove on the back surface thereof for preventing said resin of said intervening layer from leaking out when the back surface of said light guide plate and the surface of said panel are joined to each other, and wherein said electro-optical material comprises a liquid crystal which can be controlled in an alignment direction parallel to or orthogonally to a polarization direction of said illumination light converted into linearly polarized light.

11. A reflective display device according to claim 10, wherein said step of said light guide plate inclines in the range from 40 to 50 degrees toward said planar section.

12. A reflective display device according to claim 10, wherein said step comprises a curved inclined area for reflecting illumination light diffusively so as to lead it onto said first substrate.

13. A reflective display device according to claim 10, wherein each said step is formed so as to have a different angle of inclination for reflecting illumination light in accordance with the angle of inclination and leading it onto said first substrate at a different angle.

* * * * *